(12) United States Patent
Zhang et al.

(10) Patent No.: US 9,514,669 B2
(45) Date of Patent: Dec. 6, 2016

(54) DISPLAY METHOD AND ELECTRONIC DEVICE

(71) Applicants: Beijing Lenovo Software Ltd, Beijing (CN); Lenovo (Beijing) Co., Ltd., Beijing (CN)

(72) Inventors: Bo Zhang, Beijing (CN); Fei Wu, Beijing (CN); Chunlei Zhao, Beijing (CN); Junfeng Liu, Beijing (CN)

(73) Assignees: Beijing Lenovo Software Ltd., Beijing (CN); Lenovo _(Beijing) Co., Ltd., Beijing (CN)

( * ) Notice: Subject to any disclaimer, the term of this patent is extended or adjusted under 35 U.S.C. 154(b) by 122 days.

(21) Appl. No.: 13/838,987

(22) Filed: Mar. 15, 2013

(65) Prior Publication Data
US 2013/0249873 A1    Sep. 26, 2013

(30) Foreign Application Priority Data

Mar. 26, 2012 (CN) .......................... 2012 1 0082885
Mar. 27, 2012 (CN) .......................... 2012 1 0084692

(51) Int. Cl.
*G09G 3/22* (2006.01)
*G06F 3/0488* (2013.01)
(Continued)

(52) U.S. Cl.
CPC .............. *G09G 3/22* (2013.01); *G06F 1/1605* (2013.01); *G06F 1/1618* (2013.01);
(Continued)

(58) Field of Classification Search
CPC ..... G09G 3/22; G06F 1/1605; G06F 1/1618; G06F 1/1647; G06F 1/1677; G06F 1/1694
See application file for complete search history.

(56) References Cited

U.S. PATENT DOCUMENTS 7,460,091 B2    12/2008  Suzuki
7,570,418 B2    8/2009   Moriya et al.
(Continued)

FOREIGN PATENT DOCUMENTS

CN          1602127 A       3/2005
CN        101030982 A       9/2007
(Continued)

OTHER PUBLICATIONS

First Chinese Office Action regarding Application No. 201210082885.5 dated Apr. 20, 2015. English translation provided by Unitalen Attorneys at Law.
(Continued)

*Primary Examiner* — Kevin M Nguyen
*Assistant Examiner* — Sejoon Ahn
(74) *Attorney, Agent, or Firm* — Harness, Dickey & Pierce, P.L.C.

(57) ABSTRACT

The disclosure provides a display method and an electronic device. The display method is applicable to an electronic device, the electronic device including at least one display unit, the at least one display unit including a first display region and a second display region, and the first display region and the second display region being in different planes. The display method includes: acquiring display region selection information, and determining a target display region from the first display region and the second display region according to the display region selection information; and acquiring content to be displayed in a target display region, and displaying, according to the determined target display region and a preset display strategy, the content to be displayed on the target display region. The display method and the electronic device provided by the disclosure can determine a target display region from multiple display regions, thereby improving user experience.

18 Claims, 28 Drawing Sheets

(51) Int. Cl.
  *G06F 1/16* (2006.01)
  *G06F 1/32* (2006.01)
  *G06F 3/041* (2006.01)
  *G09G 3/20* (2006.01)

(52) U.S. Cl.
  CPC .......... *G06F 1/1643* (2013.01); *G06F 1/1647* (2013.01); *G06F 1/1677* (2013.01); *G06F 1/1694* (2013.01); *G06F 1/3265* (2013.01); *G06F 3/041* (2013.01); *G06F 3/0488* (2013.01); *G09G 3/20* (2013.01); *G06F 2200/1614* (2013.01); *G09G 2300/023* (2013.01); *G09G 2330/021* (2013.01); *G09G 2354/00* (2013.01); *Y02B 60/1242* (2013.01)

(56) References Cited

U.S. PATENT DOCUMENTS

| | | | |
|---|---|---|---|
| 8,417,297 B2 | 4/2013 | Lee et al. | |
| 2002/0021280 A1* | 2/2002 | Kato | G06F 3/0202 345/156 |
| 2005/0062693 A1 | 3/2005 | Suzuki | |
| 2008/0316581 A1 | 12/2008 | Moriya et al. | |
| 2009/0085920 A1* | 4/2009 | Teng et al. | 345/520 |
| 2009/0164930 A1* | 6/2009 | Chen et al. | 715/769 |
| 2009/0249245 A1* | 10/2009 | Watanabe | 715/802 |
| 2009/0295976 A1* | 12/2009 | Choi | 348/333.11 |
| 2010/0182265 A1* | 7/2010 | Kim et al. | 345/173 |
| 2010/0277665 A1* | 11/2010 | Kuo et al. | 349/58 |
| 2010/0298032 A1 | 11/2010 | Lee et al. | |
| 2010/0309158 A1* | 12/2010 | Iwayama | G06F 1/1643 345/173 |
| 2011/0063192 A1* | 3/2011 | Miller et al. | 345/1.1 |
| 2011/0126141 A1* | 5/2011 | King et al. | 715/769 |
| 2012/0081317 A1* | 4/2012 | Sirpal | G06F 1/1616 345/173 |
| 2012/0084694 A1* | 4/2012 | Sirpal et al. | 715/769 |
| 2012/0110486 A1* | 5/2012 | Sirpal et al. | 715/770 |
| 2012/0115422 A1* | 5/2012 | Tziortzis et al. | 455/73 |
| 2012/0192113 A1* | 7/2012 | Higuchi | 715/835 |
| 2013/0012264 A1* | 1/2013 | Mitsunaga | G01C 21/20 455/556.1 |
| 2013/0086508 A1* | 4/2013 | Oguz | 715/779 |
| 2013/0106704 A1* | 5/2013 | Vidal et al. | 345/169 |
| 2014/0132486 A1* | 5/2014 | Wei et al. | 345/31 |

FOREIGN PATENT DOCUMENTS

| | | |
|---|---|---|
| CN | 101286285 A | 10/2008 |
| CN | 101329487 A | 12/2008 |
| CN | 101566865 A | 10/2009 |
| CN | 101751910 A | 6/2010 |
| CN | 101893914 A | 11/2010 |
| CN | 102118470 A | 7/2011 |
| CN | 201995018 U | 9/2011 |

OTHER PUBLICATIONS

First Chinese Office Action regarding Application No. 201210084692.3 dated Jun. 3, 2015. English translation provided by Unitalen Attorneys at Law.

Second Chinese Office Action regarding Application No. 201210084692.3 dated Jan. 13, 2016. English translation provided by http://globaldossier.uspto.gov.

* cited by examiner

DISPLAY METHOD AND ELECTRONIC DEVICE

CROSS-REFERENCE TO RELATED APPLICATIONS

This application claims the benefit of Chinese patent application No. 201210082885.5 filed on Mar. 26, 2012 and the benefit of Chinese patent application No. 201210084692.3 filed on Mar. 27, 2012, both of which are incorporated herein by reference in its entireties.

FIELD OF THE INVENTION

The invention relates to the field of electronics technology, and particularly to a display method and an electronic device.

BACKGROUND OF THE INVENTION

Multiscreen electronic devices with, e.g., transparent screens or folding screens have significantly enrich people's lives. When in use, it is desirable to select a suitable target screen and to display the content to be displayed on the target screen in a suitable manner.

SUMMARY OF THE INVENTION

In view of this, the disclosure provides a display method and an electronic device, and the display method and the electronic device provided by the disclosure can achieve at least one of the following advantages: a target display region can be determined from multiple display regions; and the display angle or direction of the displayed content can be adjusted.

An embodiment of the disclosure provides a display method applicable to an electronic device, the electronic device including at least one display unit, the at least one display unit including a first display region and a second display region, and the first display region and the second display region being in different planes, the method including:

acquiring display region selection information, and determining a target display region from the first display region and the second display region according to the display region selection information; and acquiring content to be displayed in a target display region, and displaying, according to the determined target display region and a preset display strategy, the content to be displayed on the target display region.

An embodiment of the disclosure provides an electronic device, including:

at least one display unit, including a first display region and a second display region, the first display region and the second display region being in different planes;

a target display region selection unit, adapted to acquire display region selection information, and determine a target display region from the first display region and the second display region according to the display region selection information; and a display determination unit, adapted to acquire content to be displayed in a target display region, and display, according to the determined target display region and a preset display strategy, the content to be displayed on the target display region.

By using the method and the device provided by the embodiments of the disclosure, a screen with the highest usage rate is selected from multiple screens as the target screen, while the other screens may be blank or stand by, thereby reducing energy consumption. Moreover, the method and the device provided by the embodiments of the disclosure can display the content to be displayed in the selected target display region at a suitable angle or direction.

BRIEF DESCRIPTION OF THE DRAWINGS

FIGS. 7A, 7B, 7C to FIGS. 8A, 8B, 8C are respective schematic diagrams illustrating the display of a display unit satisfying a predetermined light transmittance, a flexible display unit and a double-sided bar shaped display unit from a low power consumption state to a high power consumption state in the third embodiment of the disclosure;

FIG. 10A-1 is a schematic diagram illustrating the display of a display unit satisfying a predetermined light transmittance after a rotation operation without display region adjustment in the third embodiment of the disclosure;

FIGS. 10A-2, 10B and 10C are respective schematic diagrams illustrating the display of a display unit satisfying a predetermined light transmittance, a flexible display unit and a double-sided bar shaped display unit after a rotation operation and target display region adjustment in the third embodiment of the disclosure;

DETAILED DESCRIPTION OF THE INVENTION

The embodiments of the disclosure will be described hereinafter with reference to the accompanying drawings. The elements and features described in one of the accompanying drawings or the embodiments can be combined with the elements and features described in one or more of the rest of accompanying drawings or embodiments. It should be noted that, for the purpose of clarity, representations and descriptions of components and processes not closely related to the invention or known to those skilled in the art are omitted in the accompanying drawings and the description.

Generally, a multiscreen electronic device with a transparent screen or a folding screen needs corresponding treatments in different usages of the screen for power consumption reasons, etc. Moreover, while using the electronic device, the user may switch screens to operate, therefore it is important to determine in specific application environments which screen of the multiscreen electronic device currently faces the user and thus to use the screen facing the user as a target screen.

Figure 1:
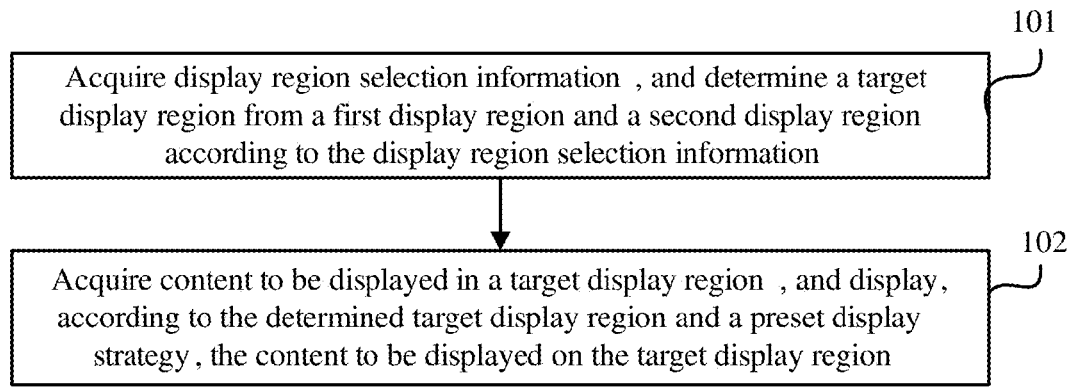
FIG. 1 is a flowchart of a display method according to a first embodiment of the disclosure.

FIG. 1 is a flowchart of a display method according to a first embodiment of the disclosure. As shown in FIG. 1, the first embodiment of the disclosure provides a display method applicable to an electronic device, the electronic device including at least one display unit, the at least one display unit including a first display region and a second display region, and the first display region and the second display region being in different planes, the method including: acquiring display region selection information, and determining a target display region from the first display region and the second display region according to the display region selection information; and acquiring content to be displayed in a target display region, and displaying, according to the determined target display region and a preset display strategy, the content to be displayed on the target display region.

Figure 2:
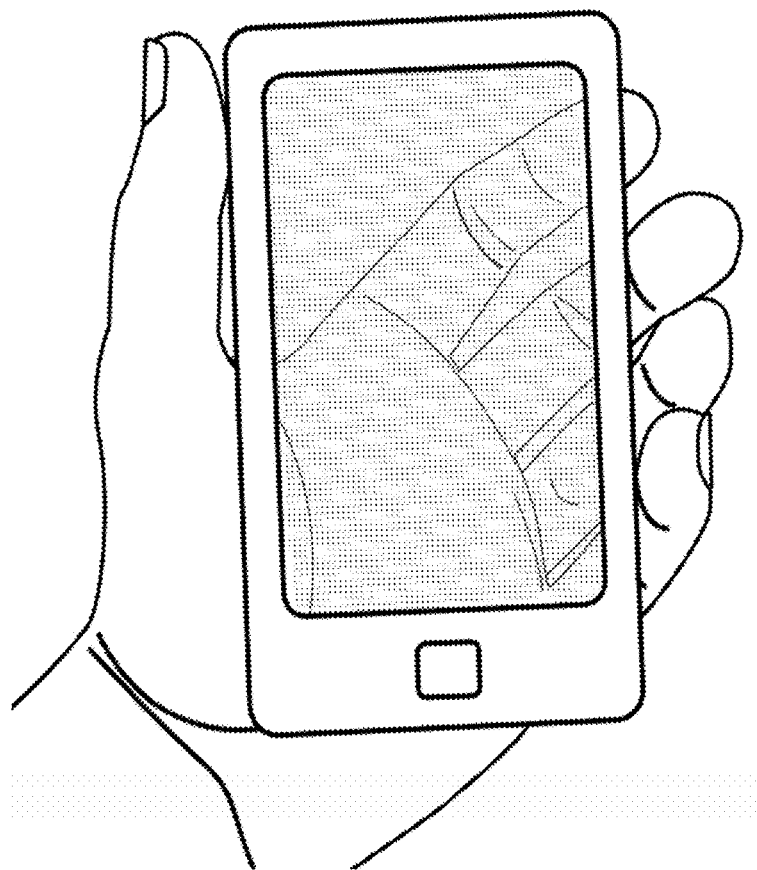
FIGS. 2 to 4 are respective schematic structural diagrams of a display unit satisfying a predetermined light transmittance, a flexible display unit and a double-sided bar shaped display unit where the first embodiment of the disclosure is applicable.
Figure 3:
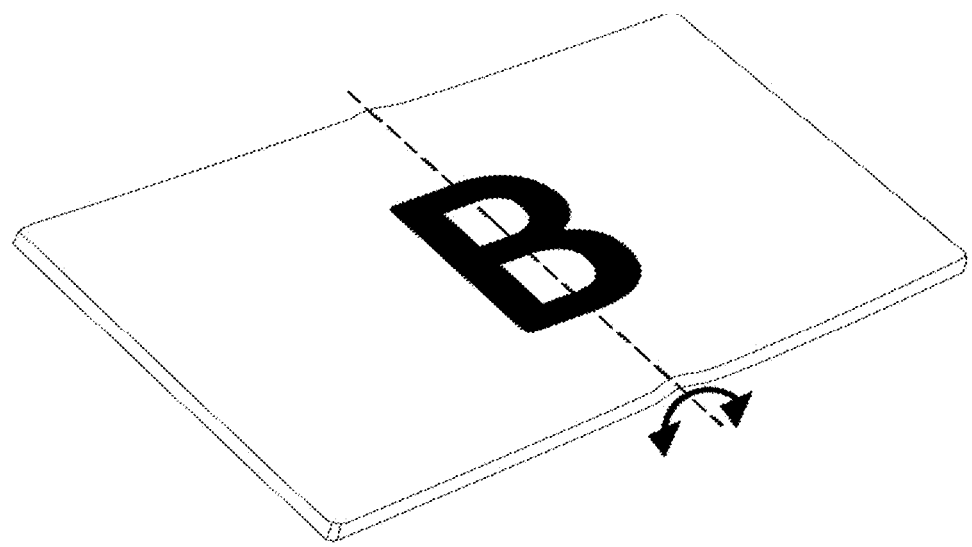
Figure 4:
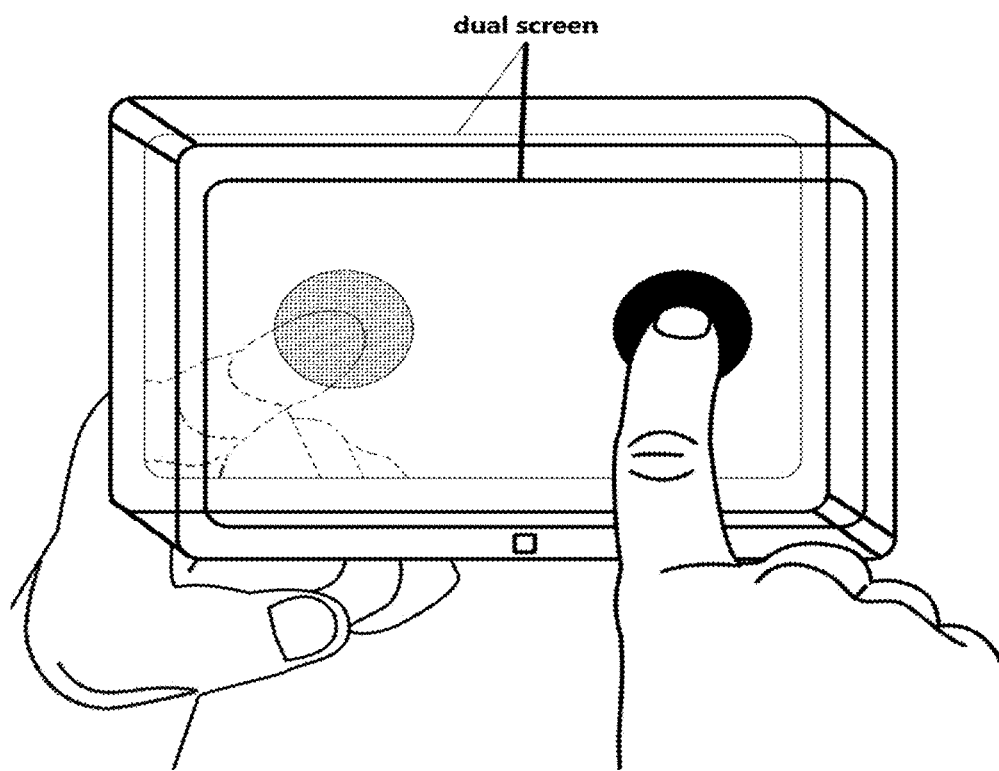

As an example, the display unit in this embodiment may be a display unit with joining screens, a display unit satisfying a predetermined light transmittance (as shown in FIG. 2, which may also be a transparent display unit), a flexible display unit (as shown in FIG. 3) and a double-sided bar shaped display unit (as shown in FIG. 4). Specifically, the display unit with joining screens refers to a display unit including a first sub-display unit and a second sub-display unit connected via a rotary component so that the first sub-display unit and the second sub-display unit can rotate with respect to the rotary component and the angle between the first sub-display unit and the second sub-display unit ranges from 0 to 360 degrees. The flexible screen refers to a display unit is made of a flexible material so that the original screen can be divided into multiple smaller sub-display regions by a user's folding operation. The double-sided bar shaped display unit includes two display regions facing different directions, and the positions of the two display regions of the double-sided bar shaped display unit are fixed relative to each other.

In this embodiment, for the display unit with joining screens, the first display region and the second display region are the first sub-display unit and the second sub-display unit of the joining screens, respectively. For the flexible screen, the first display region and the second display region are the sub-display regions from the folding operation. Those skilled in the art should understand that although in this embodiment it is described how to determine the target display region and display the content to be displayed in two display regions, the display method is also applicable to relating implementations of multiple sub-screens.

The display method provided by the disclosure will be described in detail with the following examples where the first display region and the second display region are in different planes.

The display method provided by the second embodiment of the disclosure includes steps 101 and 102.

Step 101: acquiring display region selection information, and determining a target display region from the first display region and the second display region according to the display region selection information.

In this embodiment, the display region facing the user is determined as the target display region. It should be understood that the display method of this embodiment is also applicable to a display unit including multiple display regions.

As an example, step 101 may include any one or a combination of: (B1), (B2), (B3) and (B4).

(B1) detecting whether a detection and scan region in the front of the first display region and a detection and scan region in the front of the second display region contain image information of a user, and determining the target display region according to the detection result.

As an example, the determining the target display region according to the detection result can be implemented with image recognition by, e.g., determining the number of users in the image information, or whether the image information contains a preset user image. In addition, a distance sensor may be used to determine the distance of an object included in the image information of the user, thus determining the target display region based on the image content and the distance.

The method described above is illustrated in more detail below.

To detect face information around the electronic device, whether a user is present in the front of a certain display region can be determined in many ways, hence there are many ways to determine the target display region according to the detection result. As an example, whether a detection and scan region in the front of the first display region and a detection and scan region in the front of the second display region contain image information of a user may be detected; and if image information of a user is detected in the front of any of the display regions, the display region is determined as the target display region.

As an example, an apparatus for detecting whether a detection and scan region in the front of the first display region and a detection and scan region in the front of the second display region contain image information of a user may be a face detection apparatus, or an infrared detection apparatus.

Specifically, the detection apparatus may be arranged at the four corners of the display unit. For the display unit with joining screens, each of the sub-display units may be provided with a detection apparatus. For the flexible screen, an image collection array may be arranged at the edges of the flexible screen. This is because the flexible screen may be folded more than once when in use, and one detection apparatus is not enough to provide accurate information in various folding conditions. When an image collection array is arranged at the edges of the flexible screen, detection can be achieved no matter what shape the flexible screen has been folded into, as long as the flexible screen has a portion of the edges facing the user.

As an example, it is possible that face information are detected in both of the two display regions when a face detection module is used to detect face information, and in this case, the specific determination method may be any one or a combination of (b1), (b2) and (b3).

(b1) the distances between persons corresponding to face information and the electronic device are determined according to the face information obtained from each face detection module, and the side having a smaller distance is determined as the target display side. Because the distance between a user using an electronic device and the electronic device is in a certain range, the distance between a person corresponding to face information and the electronic device can determine whether the person corresponding to the face information is the user, and thus determine a display region as the target display region.

(b2) the number of faces in each display region's face information is determined according to the face information obtained from each face detection module, and the display region having the smallest number of faces is determined as the target display region. In a normal usage environment, the face information of a display region being used by a user includes only the user's face information, while face information of multiple non-users may be detected at the back of the display region. Therefore, this method can accurately determine which face, the front or the back, of the electronic device to be used.

(b3) face information locally stored on the electronic device is acquired, face information obtained from each face detection module is compared with the stored face information, and if the face information obtained from a face detection module on a side successfully matches the stored face information, the side is determined as the target display side. Because the users of any electronic device are generally fixed, comparing the obtained face information with the stored user face information can more accurately determine the display region being used, i.e., the target display region.

(B2) detecting a contact area between an operating body and the first display region and a contact area between the operating body and the second display region to obtain a first contact area and a second contact area, comparing the first contact area and the second contact area, and determining the target display region according to the comparison result.

As an example, the detection apparatus may be a resistive or capacitive screen, or an infrared sensor, etc.

When the user handholds an electronic device, the back of the electronic device may be covered, while the front of the electronic device is not covered or the cover area (i.e., contact area) is small. Therefore, detecting the size of the contact area by the resistive or capacitive screen, can determine the display region in the electronic device that faces the user (i.e., the target display region). In addition, an infrared sensor arranged in the screen may also detect the area of the touched region in each display region.

In specific applications, any method that can realize detection of the contact area can be applied in the step of determination of the target display region in this embodiment.

In the description above, touching (i.e., contact area) is used as an example. However, in specific applications, the cross-sectional area of an operating body close to the screen (i.e., proximity area) may also be used to determine the target display region. This may be implemented using an infrared sensor or an infrared sensor array, or an ultrasonic array, etc.

In addition, in the description above, the scenario where the electronic device is handheld is used as an example, and the display region with a smaller contact area is determined as the target display region. However, depending on the actual application environments, in some cases, the display region with a larger contact area may be determined as the target display region.

(B3) detecting spatial position information of the first display region and the second display region, and determining a display region of the display regions that has spatial position information complying with a predetermined spatial position information standard as the target display region.

As an example, the detection apparatus may be a gyroscope, a gravity sensor, or an electronic compass.

Preferably, the detection apparatus is a gravity sensor, and the (B3) specifically includes: determining the front (i.e., the target display region of the display regions) of the display unit by detecting a correspondence relation between the direction of the display unit and the gravity direction.

First Scenario: In normal use, the user makes the display region being used face up, i.e., the direction of the display region being used is opposite to the gravity direction. In this case, the display region that faces oppositely to the gravity direction is determined as the target display region.

Second Scenario: When the user is lying and uses the electronic device, the display region being used faces down, i.e., the direction of the display region being used is the same as the gravity direction. In this case, the display region that faces the same as the gravity direction is determined as the target display region.

The corresponding target display region can be selected adaptively according to different usage scenarios, so that the determined target display region meets user needs better.

Figure 5:
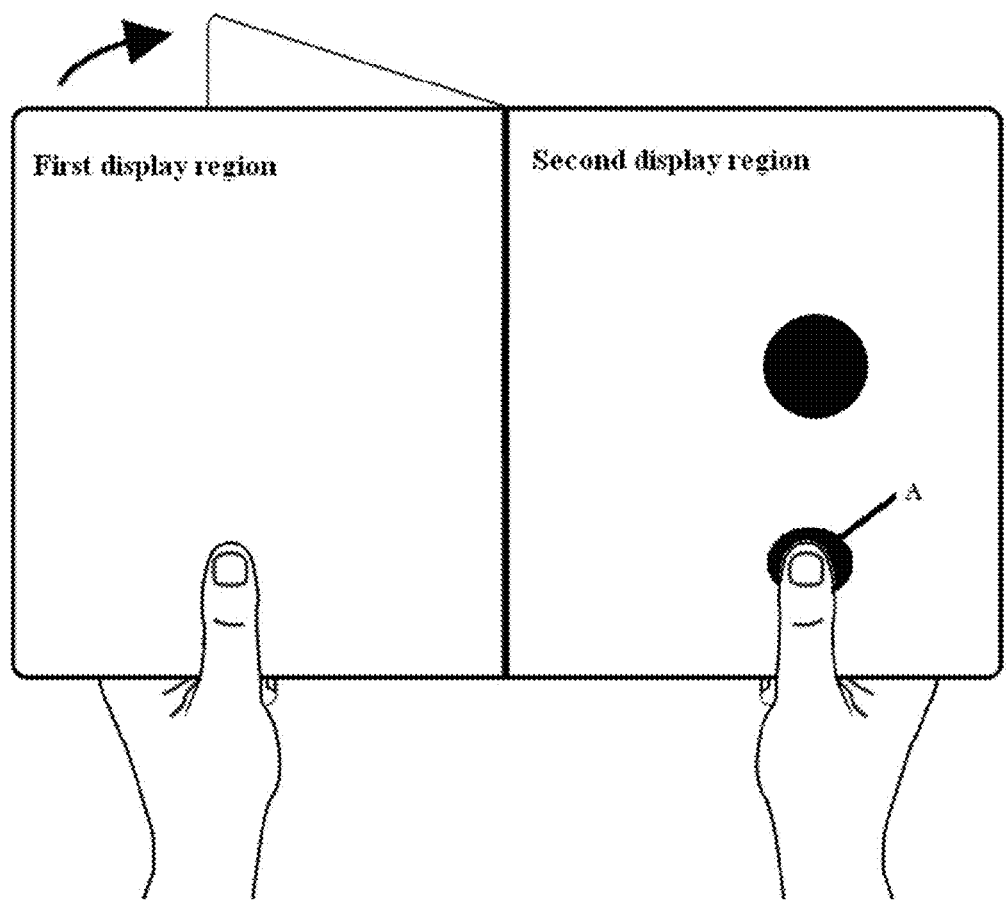
FIG. 5 is a schematic diagram illustrating the determination of a target display region by acquiring display region selection information of a user according to a display method of a second embodiment of the disclosure.

(B4) A first touch region is arranged in a specific position of both the first display region and the second display region, and when a touch time of the first touch region in any of the display regions by the user is larger than a preset threshold, the display region is determined as the target display region (FIG. 5 shows an example with a folding display unit; the method is also applicable to any specific applications with multiple display regions).

In this embodiment, the region selection information is input directly by the user when he performs the folding operation, therefore, in specific applications, in addition to detecting a long press on the screen, the contact area of the display region by the user when performing the folding operation may be detected. The specific implementation may include: when a folding operation (switch from a first state to a second state) is detected, detecting whether contact information that a user touches a display region is present in the display regions, and if so, detecting the sizes of the respective contact area corresponding to the two display region. The specific determination principle may be: determining a display region where touching takes place as the target display region, or, more specifically, determining a display region where the touch area with touching>the touch area without touching.

According to the structure shown in FIG. 5, when the first display region is folded to the back of the second display region, and a touch region A is arranged in the proximity of the bottom edge of the second display region (in specific implementations, both of the first display region and the second display region may be provided with a touch region), if a touch operation on this touch region exceeds a preset length of time, the display region is determined as the target display region. In this embodiment, a specific touch region is provided as an example. However, in specific applications, the following method may also be used: when the electronic device performs a folding operation, detecting whether a touch operation exceeding the preset length of time is present in any of the display regions, and directly determining the corresponding display region as the target display region. This approach does not require the specific touch region A.

Step 102, acquiring content to be displayed in a target display region, and displaying, according to the determined target display region and a preset display strategy, the content to be displayed on the target display region.

As an example, for a display unit that physically has two display regions, image data complying with user viewing normality can be displayed on both of the two display regions.

As an example, for a display unit that physically has two display regions, when the first display region and the second display region are in different planes, they may be used by two users at the same time, or by a single user. The display strategy may include any one or a combination of (A1) and (A2).

(A1) the usage frequency of each display icon in each display regions is detected, the display icons are sorted according to their usage frequencies, and icons having larger usage frequencies than a preset threshold are displayed on the target display region.

(A2) for an electronic device that mostly has only one user, in order to reduce power consumption, after determining the target display region, the content to be displayed is displayed only on the target display region, and the non-target display region may display preset image content, or be turned off.

This embodiment is also applicable to a display unit satisfying a predetermined light transmittance. The display unit satisfies a predetermined light transmittance in both a first direction and a second direction, the first direction is a direction from the first display region to the second display region, while the second direction is a direction from the second display region to the first display region. The first display region and the second display region shares pixels, i.e., the first display region corresponds to a first display element set, the second display region corresponds to a second display element set, and the first display element set and the second display element set have at least one common display element.

Since the two resulting display regions are back to back, when certain content is displayed in the first display region in its normal display direction, a mirror image of the content will be displayed correspondingly in the second display region. In the case that one of the first display region and the second display region is the target display region, and the other is the non-target display region, the display strategy of the display unit satisfying a predetermined light transmittance may include:

displaying the content to be displayed on the target display region in its normal display direction, and displaying a mirror image of the content to be displayed on the non-target display region.

Figure 6:
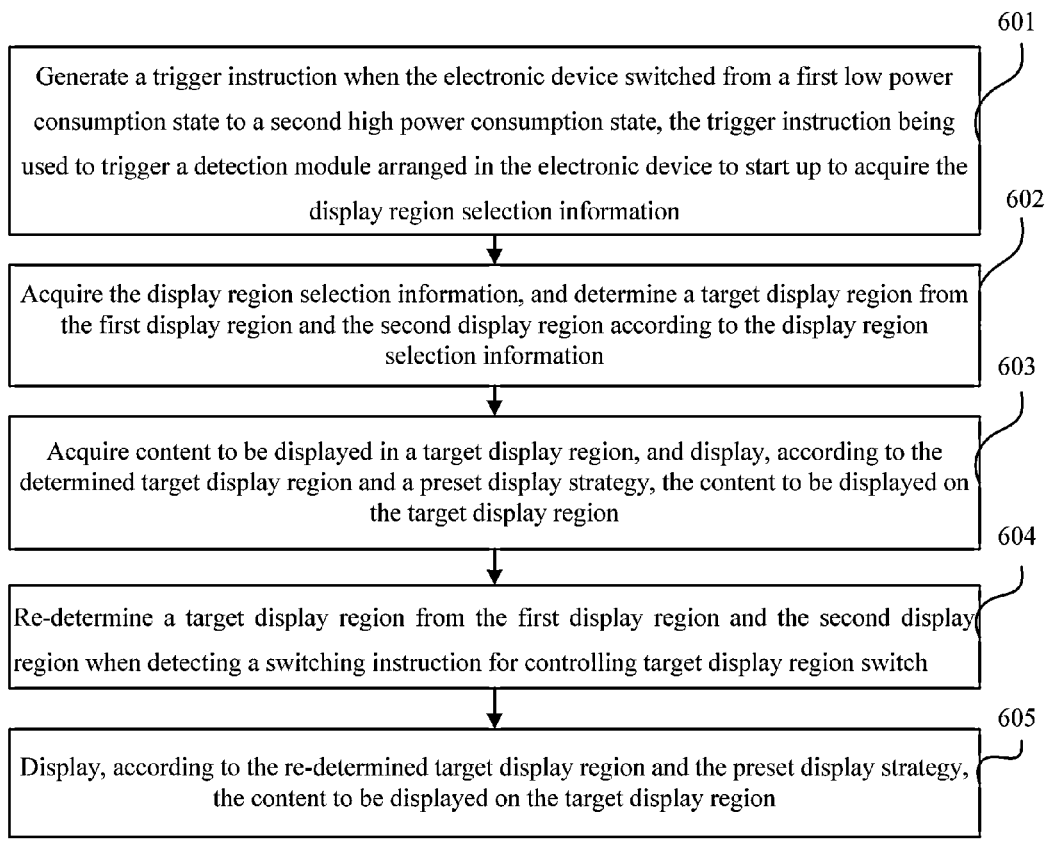
FIG. 6 is a flow chart of a display method according to a third embodiment of the disclosure.

FIG. 6 is a schematic flow chart of a display method according to a third embodiment of the disclosure. Similarly to the method according to the second embodiment, the method of the third embodiment also includes the steps 101 and 102. The difference is that the method of the third embodiment further includes steps 601 to 605.

Step 601, generating a trigger instruction when the electronic device switches from a first power consumption state to a second power consumption state, the trigger instruction being used to trigger a detection module arranged in the electronic device to start up to acquire the display region selection information.

A first power consumption of the electronic device in the first power consumption state is lower than a second power consumption of the electronic device in the second power consumption state.

In this embodiment, a display unit satisfying a predetermined light transmittance, a flexible display unit and a double-sided bar shaped display unit are used as an example. In reference numerals, XA denotes a schematic diagram of the display unit satisfying a predetermined light transmittance; XB denotes a schematic diagram of the flexible display unit; XC denotes a schematic diagram of the double-sided bar shaped display unit.

Figure 7A:
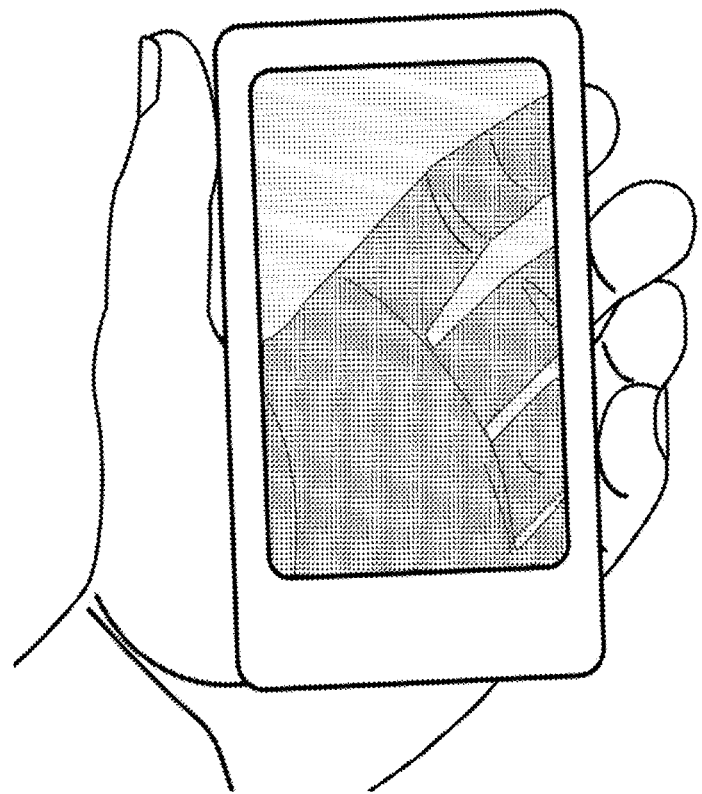
Figure 7B:
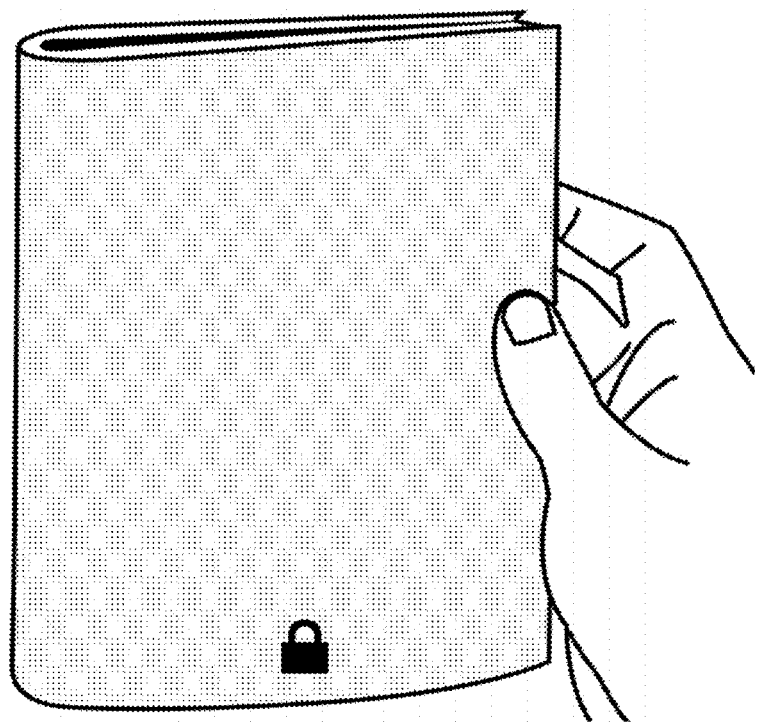
Figure 7C:
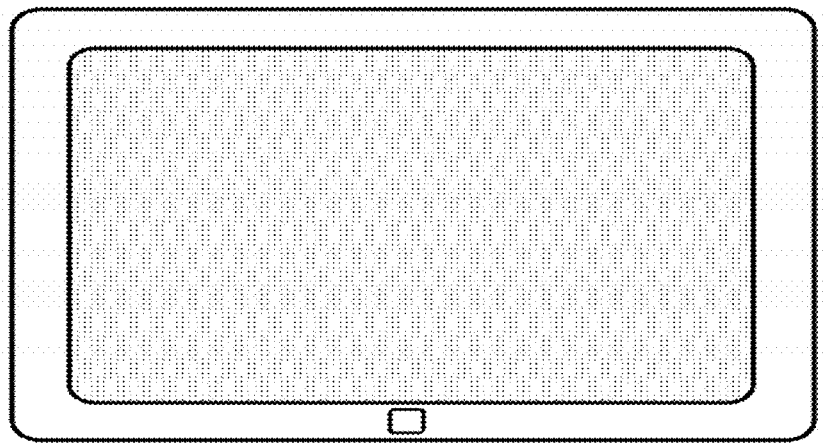
Figure 8A:
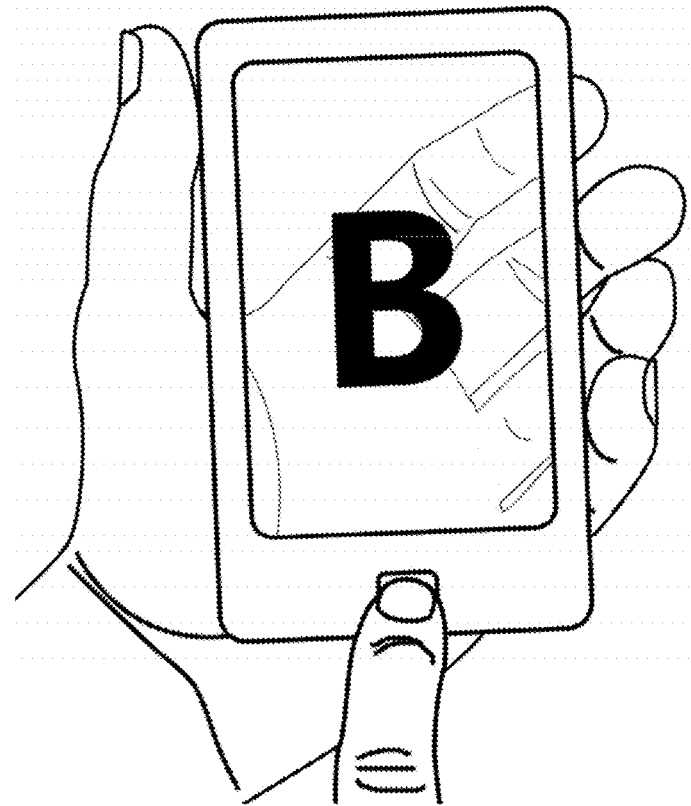
Figure 8B:
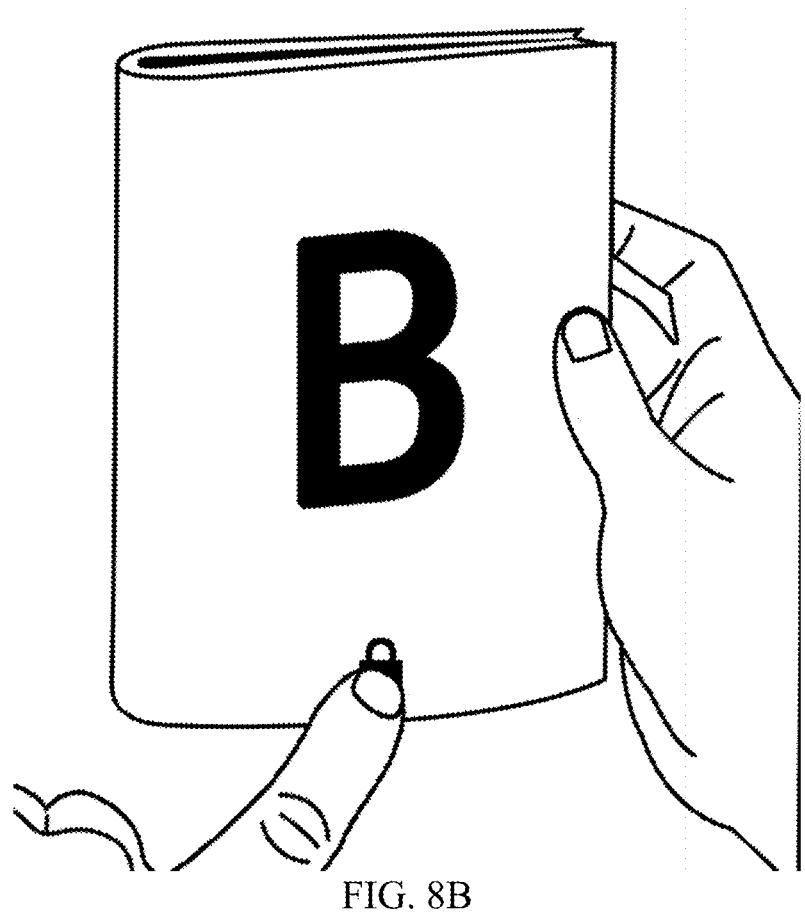
Figure 8C:
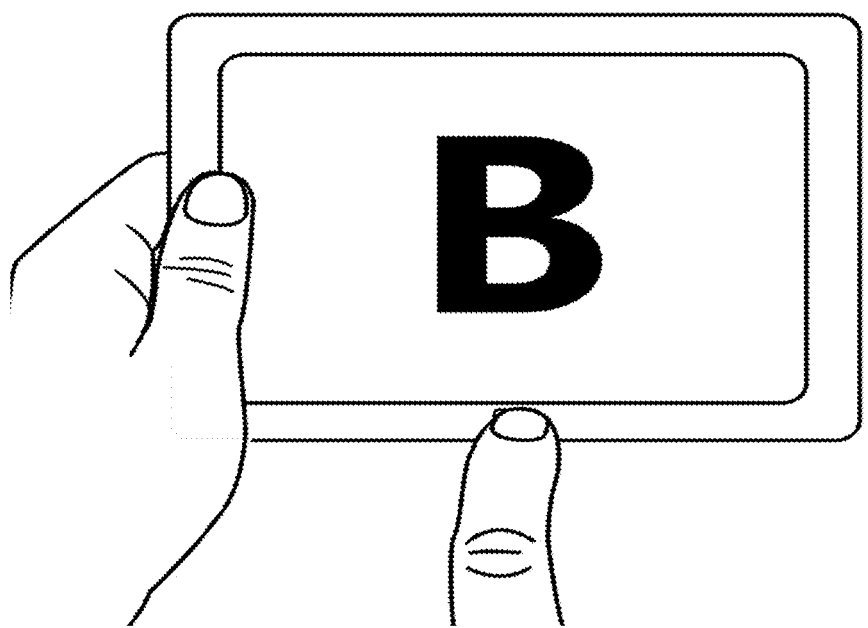

In this embodiment, the electronic device has multiple usage states, such as shutdown, standby (as shown in FIGS. 7A, 7B and 7C), and working (FIGS. 8A, 8B and 8C). And since the electronic device displays no content when it is shutdown or standby, when the electronic device switches from a shutdown or standby state to a working state, the display region goes from displaying no content to displaying certain content. Therefore, in this process, the electronic device performs an operation of activating the determined target display region and determining the orientation of the content to be displayed.

Step 602, acquiring display region selection information, and determining a target display region from the first display region and the second display region according to the display region selection information.

This embodiment is also applicable to a display unit with multiple display regions. And it is desirable to determine a target display region to display the content to be displayed while complying with user viewing normality according to the facing direction of the user.

Step 603, acquiring content to be displayed in a target display region, and displaying, according to the determined target display region and a preset display strategy, the content to be displayed on the target display region.

Furthermore, because in specific uses, the user may perform a rotation operation on the electronic device, which may cause the non-target display region and the target display region to switch. Therefore, this embodiment further includes:

Step 604, re-determining a target display region from the first display region and the second display region when detecting a switching instruction for controlling target display region switch.

Figure 9A:
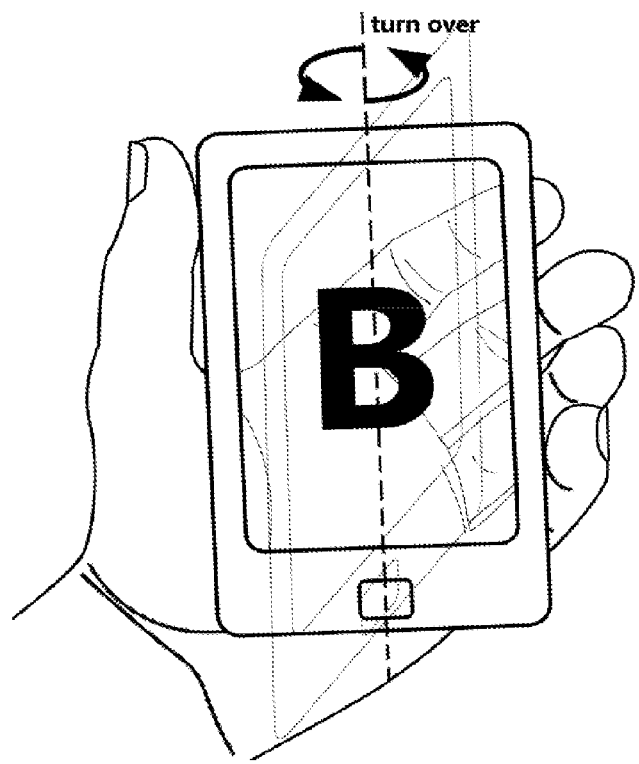
FIG. 9A, 9B, 9C are respective schematic diagrams illustrating rotation operations of a display unit satisfying a predetermined light transmittance, a flexible display unit and a double-sided bar shaped display unit in the third embodiment of the disclosure.
Figure 9B:
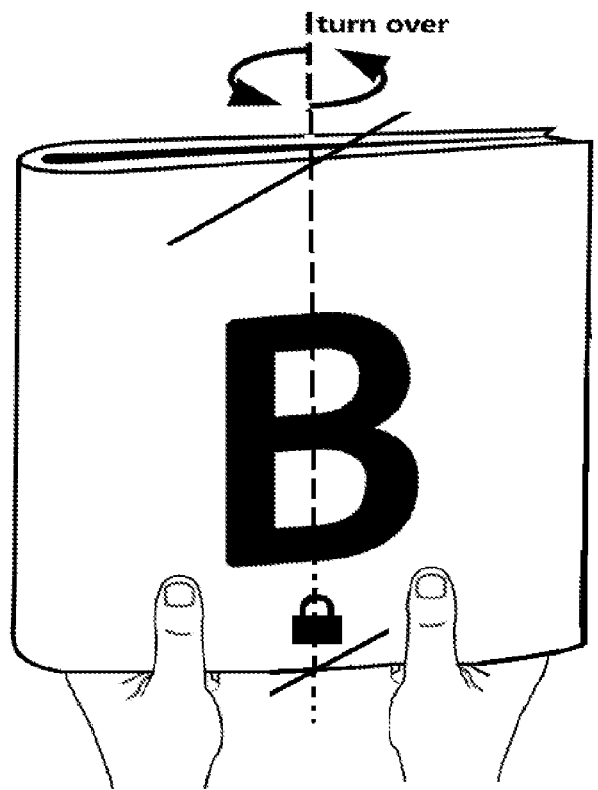
Figure 9C:
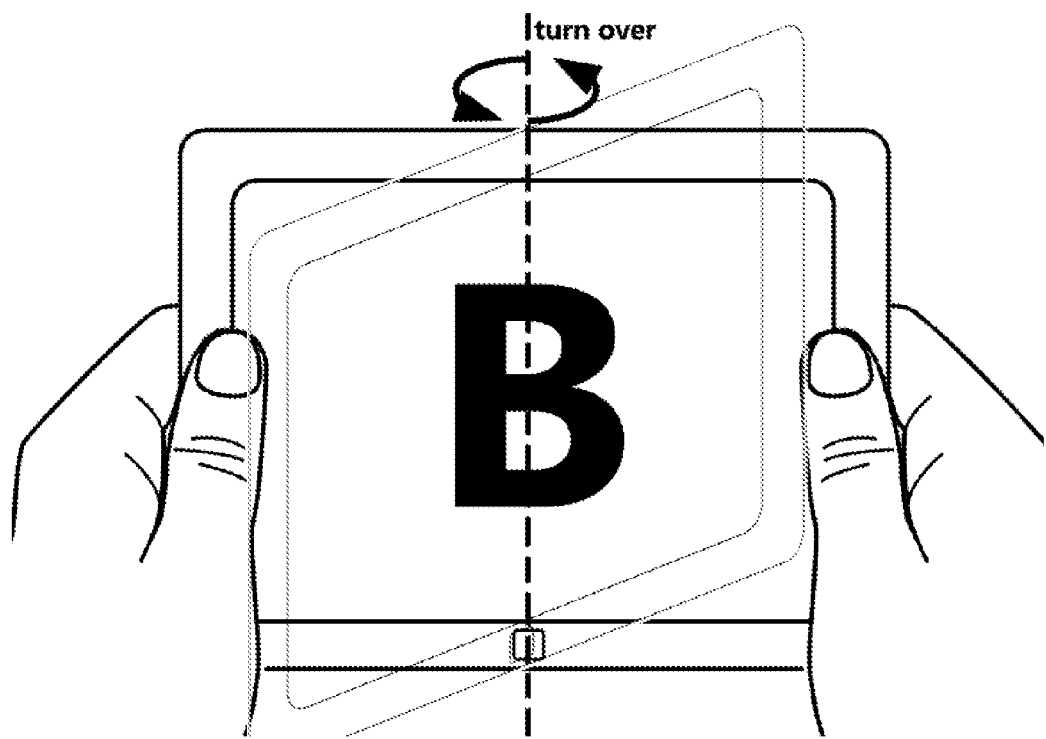
Figures 1, 10A:
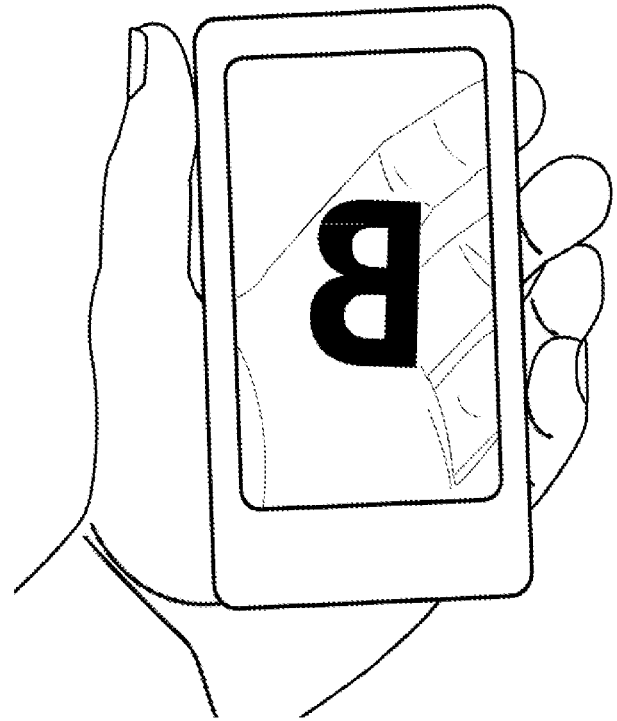
Figures 2, 10A:
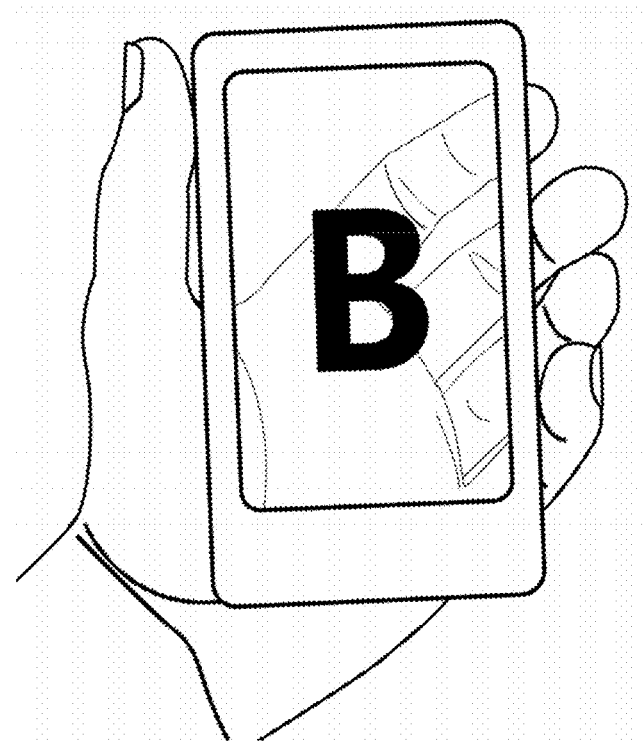
Figure 10B:
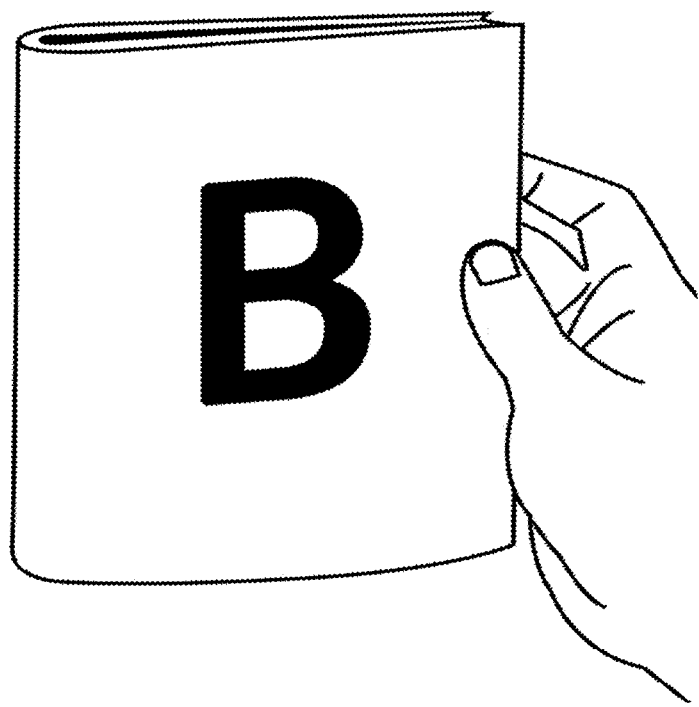
Figure 10C:
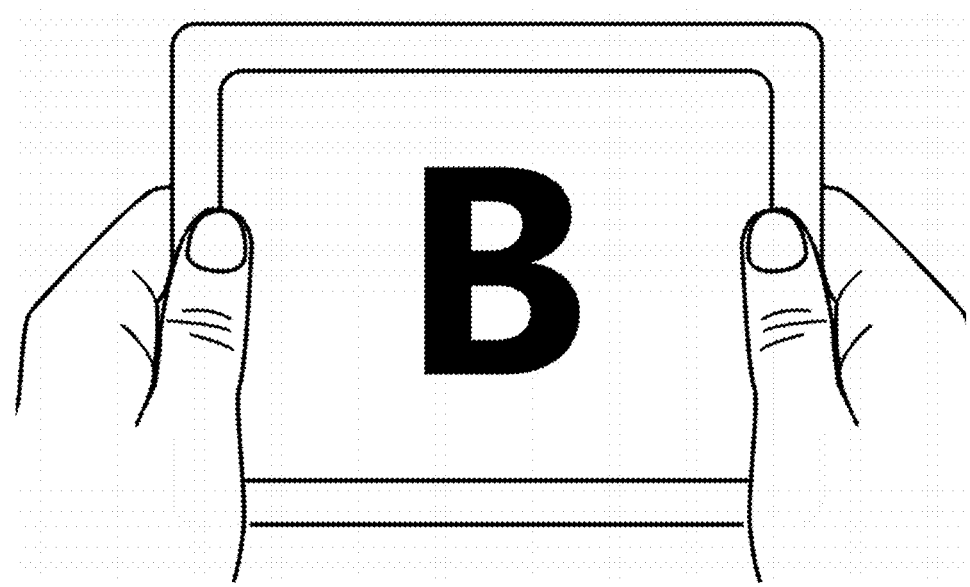

In this embodiment, the trigger of target display region switch is described with the rotary operation as an example (as shown in FIGS. 9A, 9B and 9C). If the target display region is not switched after the user performs a rotation operation, it is likely that the display region facing the user does not display content in a way that complies with user viewing normality (as shown in FIG. 10A-1). In specific application environments, target display region switch may be triggered according to selection information input by the user or other ways.

Step 605, displaying, according the re-determined target display region and the preset display strategy, the content to be displayed on the target display region (the adjusted images are shown in FIGS. 10A-2, 10B and 10C).

In this embodiment, before step 604 of re-determining a target display region from the first display region and the second display region when detecting a switching instruction for controlling target display region switch, any one or a combination of (C1), (C2) and (C3) may be used to determine whether the user performs a rotation operation or inputs corresponding display region switching information, where one of the first display region and the second display region is the target display region, and the other is the non-target display region:

(C1) detecting whether a detection and scan region in the front of the first display region and a detection and scan region in the front of the second display region contain image information of a user, and generating the switching instruction if the detection result shows that it is needed to perform target display region switch.

When performing a specific detecting operation, if a face detection module is used to detect the face information, it is possible that face information is detected in both of the display regions. In this case, the specific determination may include:

(c1) Because the distance between a user using an electronic device and the electronic device is in a certain range, the distance between a person corresponding to face information and the electronic device can determine whether the person corresponding to the face information is the user. The distances between persons corresponding to face information and the electronic device are determined according to the face information obtained from each face detection module. If the target display region is determined at a first moment where the side having a smaller distance is determined as the target display side, and when the target display region has been determined, it is determined whether the user rotates the electronic device, by detecting in real time the distance between the face and the electronic device. If the detected distance between the face and a certain non-target display region becomes smaller than the detected distance between the face and the target display region, it is determined that the user performs a rotation operation, accordingly, a target display region switching instruction is generated.

(C2) In a normal usage environment, the face information of a display region being used by a user includes only the user's face information, while face information of multiple non-users may be detected at the back of the display region. The number of faces in each display region's face information is determined according to the face information obtained from each face detection module. If the target display region is detected at a first moment where the display region having the smallest number of faces is determined as the target display region, and when the target display region has been determined, it is determined whether the user rotates the electronic device by detecting in real time the number of faces in the non-target display region and the target display region. If at a moment the number of detected faces in the non-target display region is 1 and the number of detected faces in the target display region is greater than 1, it is determined that the user performs a rotation operation, accordingly a target display region switching instruction is generated. Therefore, the method can more accurately determine the front and back of the electronic device.

(C3) Because the users of any electronic device are generally fixed, comparing the obtained face information with the stored user face information can more accurately determine the display region being used, i.e., the target display region. Face information locally stored on the electronic device is acquired, face information obtained from each face detection module is compared with the stored face information, and if the face information obtained from a face detection module on a side successfully matches the stored face information, the side is determined as the target display side. When the target display region has been determined, it is determined whether the user rotates the electronic device by detecting in real time face information in the non-target display region. If at a certain moment the face information of the non-target display region successfully matches the stored face information, it is determined that the user performs a rotation operation, accordingly a target display region switching instruction is generated.

(C2) detecting a contact area between an operating body and the first display region and a contact area between the operating body and the second display region to obtain a first contact area and a second contact area, comparing the first contact area and the second contact area, and comparing the obtained current comparison result with a stored previous comparison result to obtain a comparison value, determining whether the comparison value is greater than a first threshold, and generating the switching instruction if it is determined that the comparison value is greater than the first threshold.

A usage environment of this embodiment is described as follows. When the user handholds an electronic device, the back of the electronic device may be covered, while the front of the electronic device is not covered or the cover area (i.e., contact area) is small. Therefore, detecting the size of the contact area by the resistive or capacitive screen, can determine the display region in the electronic device that faces the user (i.e., the target display region). In addition, an infrared sensor arranged in the screen may also detect the area of the touched region in each display region.

In the embodiment above, the implementation with a capacitive or resistive touch screen is described as an example. However, any other method that can realize detection of the touch area can be applied in the step of determination of the target display region in the embodiment.

In the description above, touching (i.e., contact area) is used as an example. However, in specific applications, the cross-sectional area of an operating body close to the screen (i.e., proximity area) may also be used to determine the target display region. This may be implemented using an infrared sensor or an infrared sensor array, or an ultrasonic array, etc.

In addition, in the description above, the scenario where the electronic device is handheld is used as an example, and the display region with a smaller contact area is determined as the target display region. However, depending on the actual application environments, in some cases, the display region with a larger contact area may be determined as the target display region.

In this embodiment, when the target display region has been determined, the contact areas of both the target display region and the non-target display region are detected in real time, and the detected areas are compared to obtain a comparison result. The comparison result may be a ratio or a difference value. If at a certain moment it is detected that the ratio changes from greater than 1 to less than 1, or changes from less than 1 to greater than 1, it is determined that the user performs a rotation operation, accordingly a target display region switching instruction is generated. If at a certain moment the detected difference value changes from a positive number to a negative number, it is determined that the user performs a rotation operation, accordingly a target display region switching instruction is generated.

(C3) detecting spatial position information of the first display region and the second display region, comparing the current spatial position information with stored previous spatial position information, and generating the switching instruction if the current spatial position information is different from the stored previous spatial position information.

In this embodiment, the detection apparatus may be a gyroscope, a gravity sensor, or an electronic compass. In this embodiment, preferably, the detection apparatus is a gravity sensor, and the specific implementation step may include:

determining the front (i.e., the target display region of the display regions) of the display unit by detecting a correspondence relation between the direction of the display unit and the gravity direction.

In normal use, the user makes the display region being used face up, i.e., the direction of the display region being used is opposite to the gravity direction. In this case, the display region that faces oppositely to the gravity direction is determined as the target display region. If at a certain moment the direction of the target display region is to the same as the gravity direction, it is determined that the user performs a rotation operation, accordingly a target display region switching instruction is generated.

Figure 11:
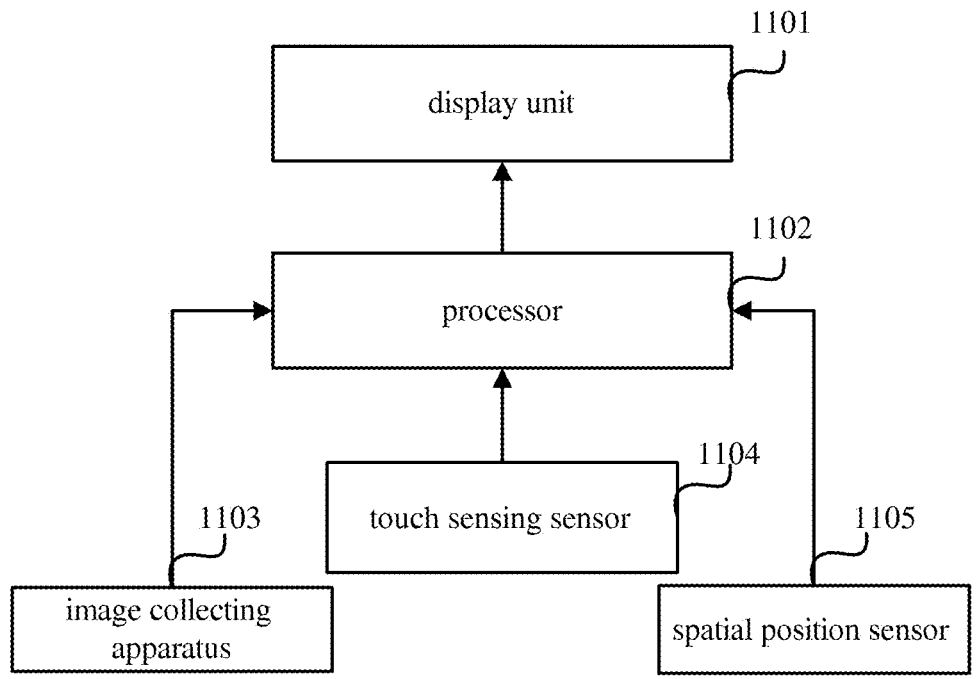
FIG. 11 is a schematic structure diagram of an electronic device provided by a fourth embodiment of the disclosure.

FIG. 11 is a schematic structure diagram of an electronic device provided by a fourth embodiment of the disclosure. As shown in FIG. 11, the electronic device includes:

at least one display unit 1101 including a first display region and a second display region, the first display region and the second display region being in different planes in a first state;

a processor 1102, adapted to acquire display region selection information, and determine a target display region from the first display region and the second display region according to the display region selection information; acquire content to be displayed in a target display region, and display, according to the determined target display region and a preset display strategy, the content to be displayed on the target display region.

Figure 12:
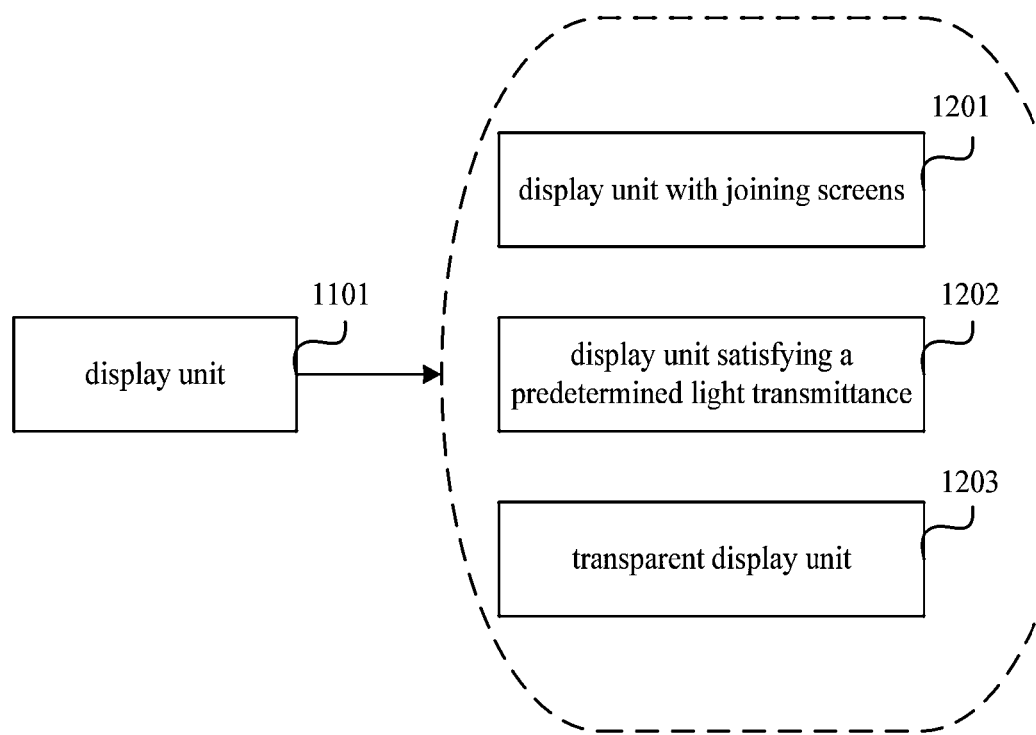
FIG. 12 is a schematic structure diagram of a display unit in the fourth embodiment of the disclosure.

As shown in FIG. 12, the display unit in the embodiment may be a display unit including multiple display regions, such as a display unit with joining screens, a display unit satisfying a predetermined light transmittance, a flexible display unit and a double-sided bar shaped display unit. The display unit of the device may be one of the flowing display units:

a display unit with joining screens 1201, including a first sub-display unit and the second sub-display unit, the first sub-display unit and the second sub-display unit being in the same plane in a second state, the first sub-display unit and the second sub-display unit correspond to the first display region and the second display region respectively; or a flexible display unit 1202, and in a second state, the first display region and the second display region are in the same plane, if a folding operation is performed on the flexible display unit, the flexible display unit may switch between the first state and the second state; or a display unit satisfying a predetermined light transmittance 1203, the first display region of the display unit satisfying a predetermined light transmittance 1203 corresponds to a first display element set, the second display region corresponds to a second display element set, and the first display element set and the second display element set have at least one common display element.

In the embodiment of the disclosure, in order to select, from multiple display regions, a display region which is facing the user to display content concerned by the user on the display region, the electronic device further includes:

an image collecting apparatus 1103, adapted to detect whether a detection and scan region in the front of the first display region and a detection and scan region in the front of the second display region contain image information of a user, in which if image information of a user is detected in one of the display regions, this display region is determined as the target display region; or a touch sensing sensor 1104, adapted to detect a contact area between an operating body and the first display region and a contact area between the operating body and the second display region to obtain a first contact area and a second contact area, compare the first contact area and the second contact area, and determine the target display region according to the comparison result; or a spatial position sensor 1105, adapted to detect spatial position information of the first display region and the second display region, and determine one of the display region which complies with a predetermined spatial position information standard as the target display region.

Figure 13:
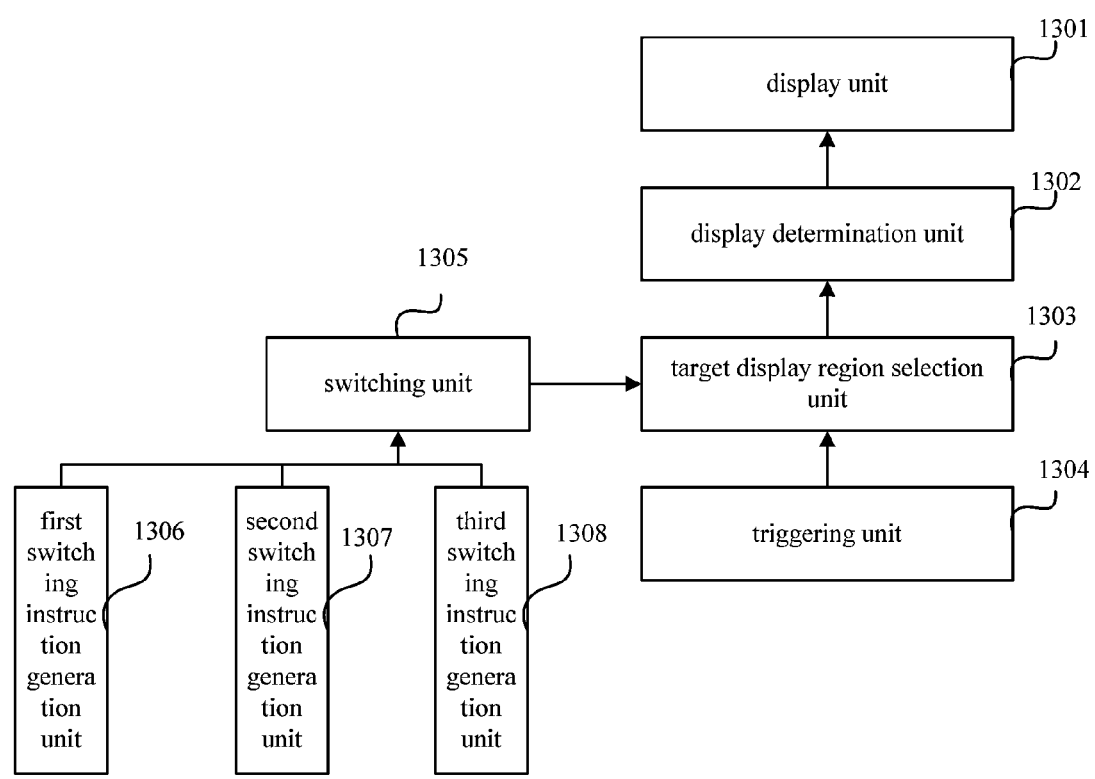
FIG. 13 is a schematic structure diagram of an electronic device provide by a fifth embodiment of the disclosure.

FIG. 13 is a schematic structure diagram of an electronic device provide by a fifth embodiment of the disclosure. As shown in FIG. 13, the electronic device includes:

at least one display unit 1301 including a first display region and a second display region, the first display region and the second display region being in different planes;

wherein the first display region of the at least one display unit corresponds to a first display element set, and the second display region corresponds to a second display element set, the first display element set and the second display element set have at least one common display element;

one of the first display region and the second display region is the target display region and the other is a non-target display region, the display determination unit is further adapted to display the content to be displayed on the target display region in its normal display direction and display a mirror image of the content to be displayed on the non-target display region.

a target display region selection unit 1302 adapted to acquire display region selection information, and determine a target display region from the first display region and the second display region according to the display region selection information;

a display determination unit 1303, adapted to acquire content to be displayed in a target display region, and display, according to the determined target display region and a preset display strategy, the content to be displayed on the target display region.

Figure 14:
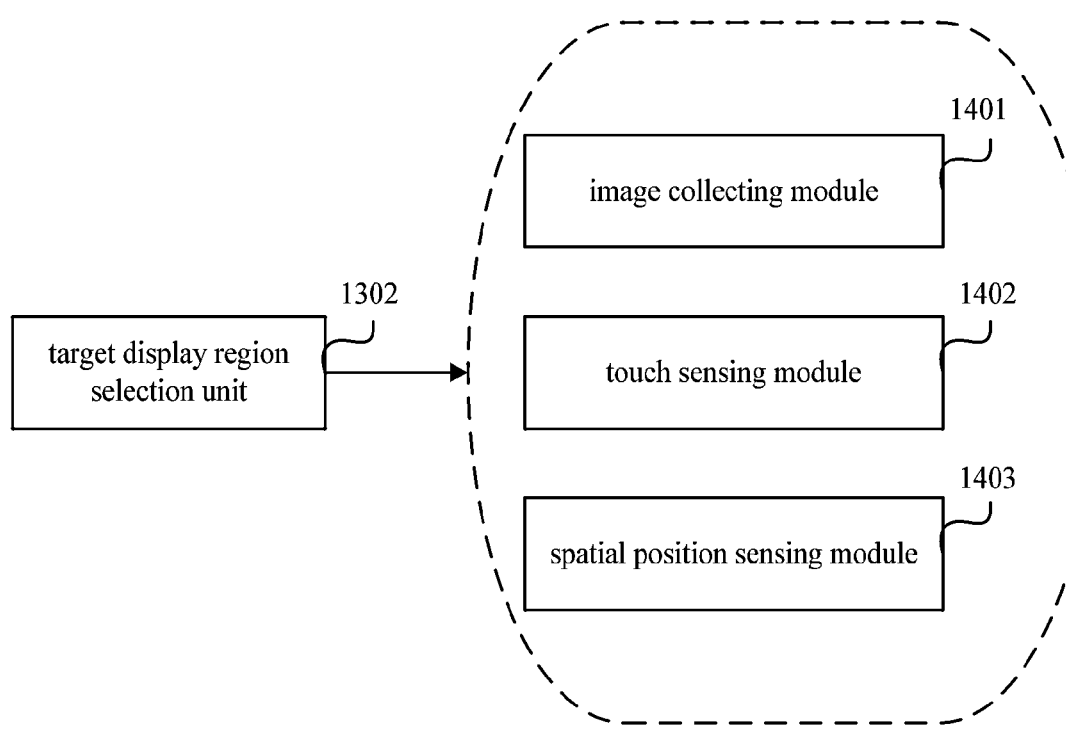
FIG. 14 is a schematic structure diagram of a target display region selection unit in the fifth embodiment of the disclosure.

As shown in FIG. 14, the embodiment of the disclosure, in order to select, from multiple display regions, a display region which is facing the user to display content concerned by the user on the display region, target display region selection unit 1302 includes one of the following modules or a combination thereof:

an image collecting module 1401, adapted to detect whether a detection and scan region in the front of the first display region and a detection and scan region in the front of the second display region contain image information of a user;

a touch sensing module 1402, adapted to detect a contact area between an operating body and the first display region and a contact area between the operating body and the second display region to obtain a first contact area and a second contact area, compare the first contact area and the second contact area, and determine the target display region according to the comparison result;

a spatial position sensing module 1403, adapted to detect spatial position information of the first display region and the second display region, and determine a display region of the display regions that has spatial position information complying with a predetermined spatial position information standard as the target display region.

Because the electronic device has multiple usage states, such as a shutdown state or a standby state, a working state. And since the electronic device display no content when it is in the shutdown state or the standby state, when the electronic device switches from the shutdown state or the standby state to the working state, the display region switches from a state of displaying no content to a state of displaying certain content. Therefore, when performing this process, the electronic device needs to activate an operation for determining the target display region and determining the orientation of the content. And thus the electronic device further includes:

a triggering unit 1304, adapted to generate a trigger instruction when the electronic device switches from a first power consumption state to a second power consumption state, wherein the trigger instruction is used to trigger a detection module arranged in the electronic device to start up to acquire the display region selection information, wherein a first power consumption of the electronic device in the first power consumption state is lower than a second power consumption of the electronic device in the second power consumption state.

Because this embodiment is applied to the display unit with multiple display regions, it is necessary to determine one target display region to display the content complying with user viewing normality according to the facing direction of the user, the electronic device further includes:

a switching unit 1305, adapted to re-determine a target display region from the first display region and the second display region when detecting a switching instruction for controlling target display region switch, and display the content to be displayed on the target display region according to the re-determined target display region and a preset display strategy.

Further, because in the specific usage process, the user may be interested in perform a rotation operation on the electronic device, the rotation operation may cause the non-target display region and the target display region to switch. One of the first display region and the second display region is the target display region, and the other is the non-target display region, the electronic device further includes:

a first switching instruction generation unit 1306, adapted to detect whether a detection and scan region in the front of the first display region and a detection and scan region in the front of the second display region contain image information of a user, and generate the switching instruction if the detection result shows that it is needed to perform target display region switch; or a second switching instruction generation unit 1307, adapted to detect a contact area between an operating body and the first display region and a contact area between the operating body and the second display region to obtain a first contact area and a second contact area, compare the first contact area and the second contact area, compare the current comparison result with a stored previous comparison result to obtain a comparison value, determine whether the comparison value is greater than a first threshold, and generate the switching instruction if the comparison value is greater than the first threshold; or a third switching instruction generation unit 1308, adapted to detect spatial position information of the first display region and the second display region, compare the current spatial position information with stored previous spatial position information, and generate the switching instruction if the current spatial position information is different from stored previous spatial position information.

Figure 15:
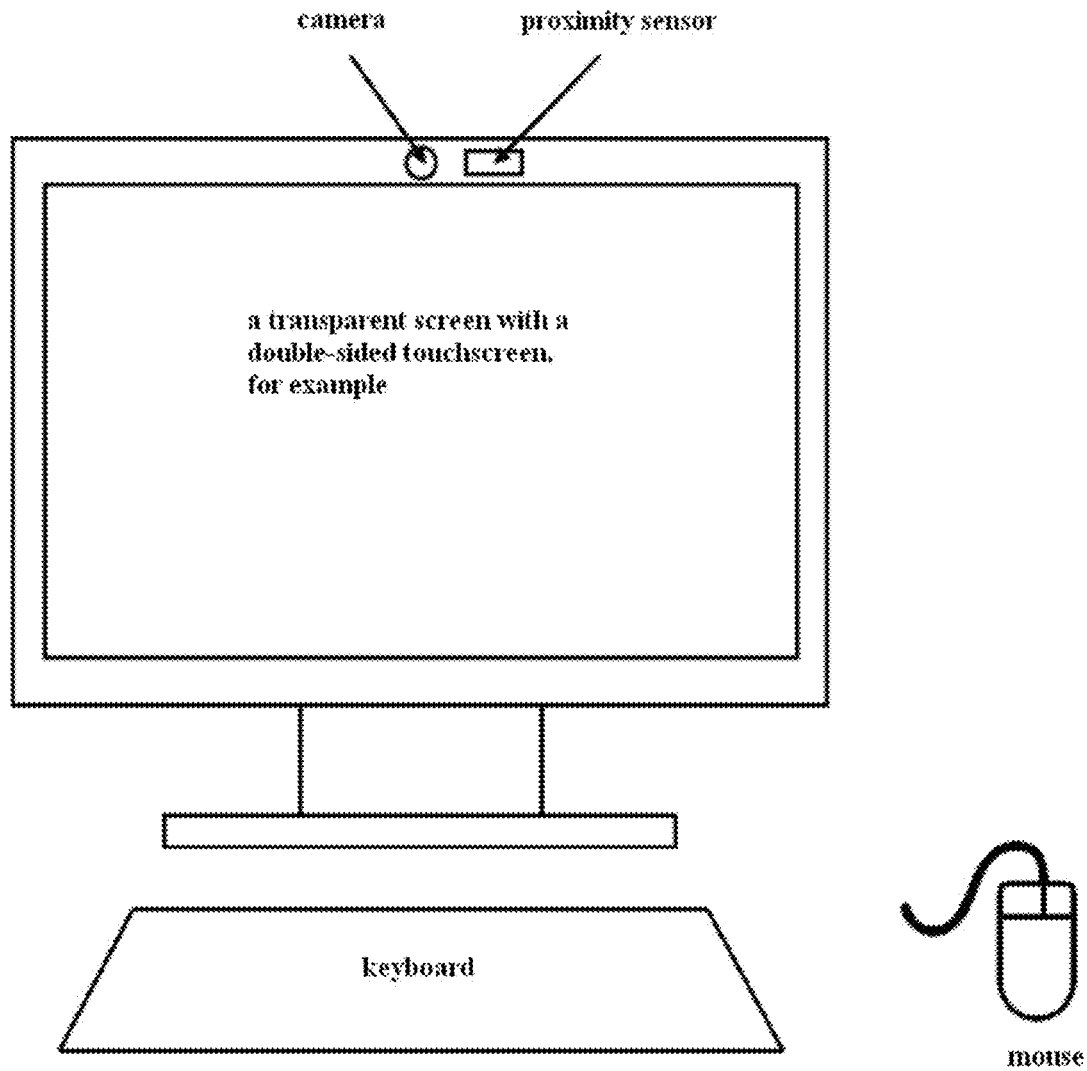
FIGS. 15 and 16 are schematic structure diagrams illustrating a device in another application environment according to a sixth embodiment of the disclosure.
Figure 16:
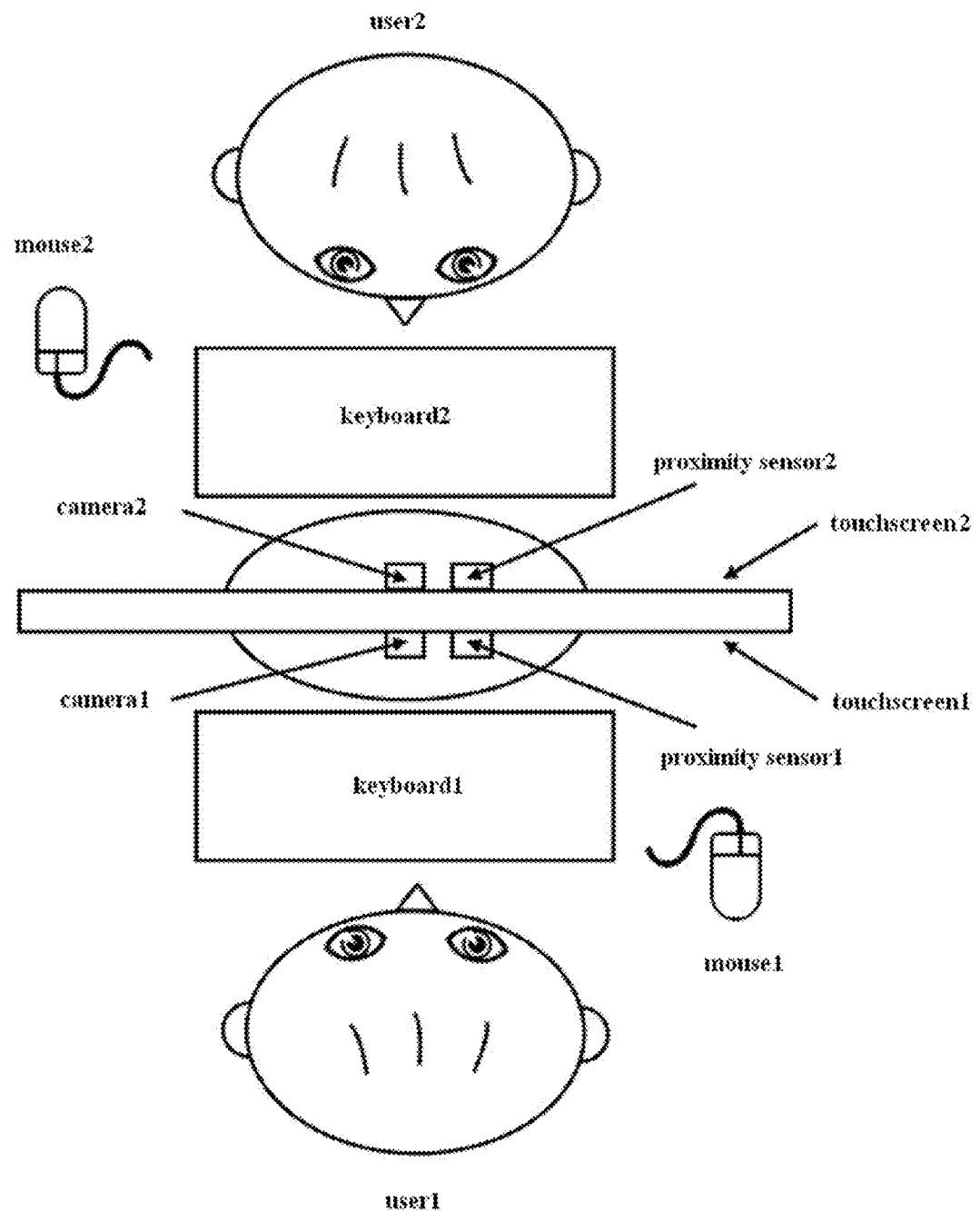

The above embodiment describes the solution for a handheld electronic device. FIGS. 15 and 16 are respective schematic structure diagrams of a device in another application environment according to a sixth embodiment of the disclosure.

In the specific application environment, the solution provided by the embodiment of the disclosure is also applicable to a display device with a larger display area (as shown in FIG. 15). As shown in FIG. 16, if the method is used in an electronic device with a large screen, such as computer equipment including multiple display regions, in the solution of method, in addition to the above method for determining a target display region, because the large-screen device may also include some external input and operation apparatuses, when the method provided by the disclosure is applied to a large-screen device, the method can determine the target display region by one of the following manners or a combination thereof:

(D1) When the system detects that a touch screen at a certain side is activated, the system makes the display of the transparent screen towards the corresponding side; i.e. it is detected whether there is a touch-control operation on the two display regions, if there is, the display region with the touch-control operation is determined as the target display region.

(D2) when the system detects that a keyboard corresponding to a first side of the transparent screen is activated, content to be displayed in the transparent screen is automatically displayed at the first side in its normal display direction, and the other side displays the mirror image of the content;

(D3) when the system detects that a mouse corresponding to a first side of the transparent screen is activated, content to be displayed in the transparent screen is automatically displayed at the first side in its normal display direction, and the other side displays the mirror image of the content;

(D4) when the system detects that a touch-control plate corresponding to a first side of the transparent screen is activated, content to be displayed in the transparent screen is automatically displayed at the first side in its normal display direction, and the other side displays the mirror image of the content.

The method and device provided by the embodiment can determine any one of at least two screens as the target display region by a variety of sensors or by receiving the selection information, and the target display region displays the content to be displayed in a normal direction display state. A screen with the highest usage rate is selected from multiple screens as a target screen, while the other screens perform a black screen operation or a standby operation, which can achieve reduced energy consumption. And selecting the target display region according to the characteristic parameters of the user can improve the user experience. Further, it achieves the effect of selecting a visual screen timely from multiple screens according to the characteristic parameters of the user.

A seventh embodiment of the disclosure provides a display method. This embodiment is applicable to a display unit satisfying a predetermined light transmittance. Specifically, a light transmittance from the first display region to the second display region and a light transmittance from the second display region to the first display region meet a preset light transmittance threshold. Based on the second embodiment, the seventh embodiment provides a method for acquiring the region selection information by detecting a spatial parameter value of the display unit.

Figure 17:
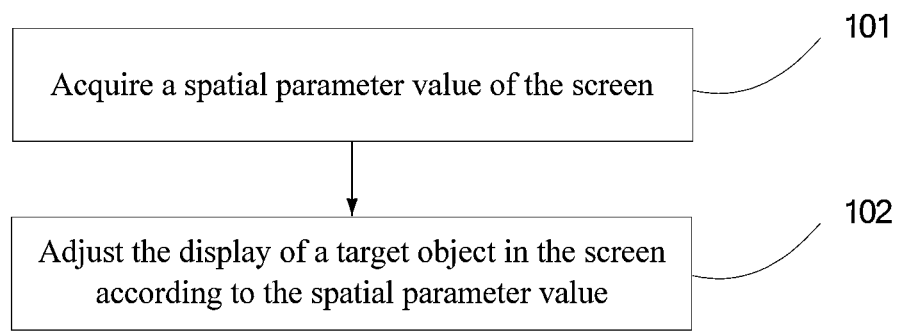
FIG. 17 is a flowchart of a display method provided by a seventh embodiment of the disclosure.

FIG. 17 is a flowchart of a display method provided by the seventh embodiment of the disclosure. As shown in FIG. 17, the display method includes steps 701 and 702.

Step 701, acquiring the value of spatial parameters of the display unit.

As an example, the value of the spatial parameters can be the value of the spatial parameters of the screen relative to a preset reference system/object.

Figure 18:
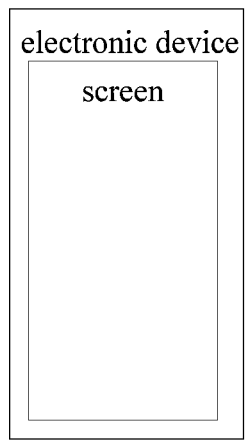
FIG. 18 is a schematic diagram illustrating the display of a screen in the seventh embodiment of the disclosure.

For the bar shaped electronic device, as shown in FIG. 18, the screen of the bar shaped electronic device is located on the electronic device, obtaining a spatial parameter value of the screen means obtaining the spatial parameter value of the electronic device relative to a preset reference system. In FIG. 18, the preset reference system may be a longitudinal axis perpendicular to the sea level (hereinafter, referred to as a standard axis).

As an example, acquiring the spatial parameter value of the electronic device relative to the preset reference system specially includes: acquiring the spatial parameter component of the electronic device relative to the stand axis.

This embodiment is also applicable to a clamshell electronic device. The clamshell electronic device includes a device body and a device cover, and the device body and the device cover are connected via a hinge so that they can be flipped. The device body may include a keyboard, a battery, a memory, a communication system, and other functional apparatuses. The device cover may include a screen, a microphone, a handset, and other functional devices. The screen includes an ordinary screen, a dual-screen and a transparent screen.

Figure 19:
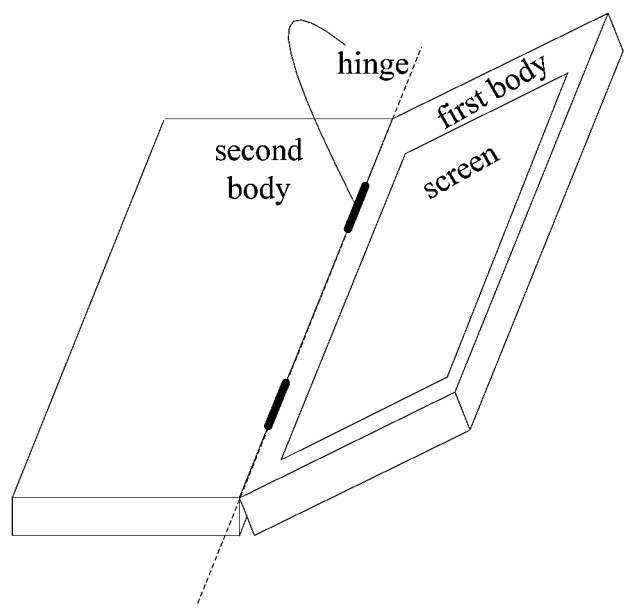
FIG. 19 is a schematic diagram illustrating the display of a screen in the seventh embodiment of the disclosure.

For the clamshell electronic device, as shown in FIG. 19, a first body and a second body are connected via a hinge, the screen of the clamshell electronic device is arranged on the first body, obtaining the spatial parameter value of the screen means obtaining the spatial parameter value of the first body relative to a preset reference object. In FIG. 19, and the preset reference object is the second body.

Optionally, for the clamshell electronic device, the spatial parameter value of the display unit on the first body can also be obtained in accordance with the way of obtaining the spatial parameter value for the bar shaped electronic device in FIG. 18. This implementation way is similar to the implementation way show in FIG. 18, which will not be described in detail herein.

Step 702, adjusting the display of the target object on the display unit according to the spatial parameter value.

Figure 20:
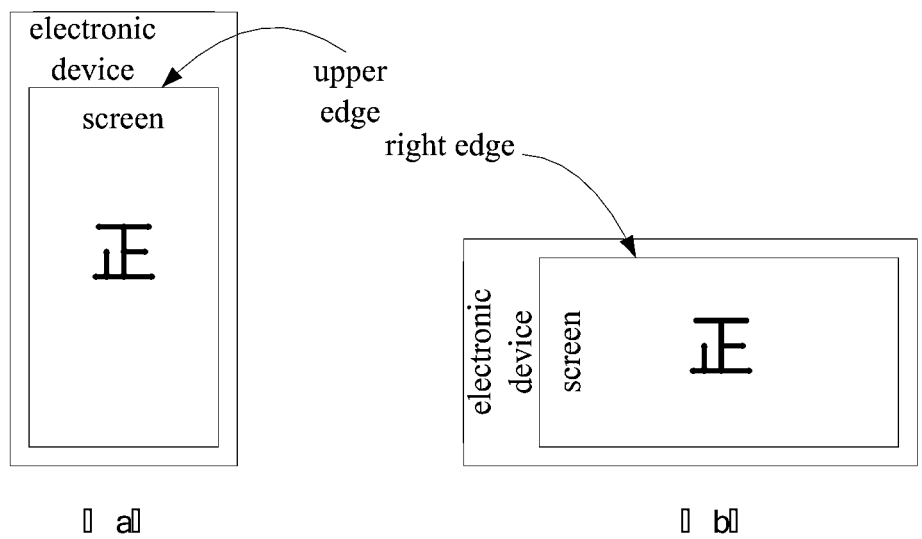
FIG. 20 is a schematic diagram illustrating the display of a screen in the seventh embodiment of the disclosure.

The display of the target object on the screen is adjusted according to the spatial parameter value acquired in the step 701 in accordance with a preset mapping relation. The target object is the display content, adjusting the display of the target object on the screen in accordance with the preset mapping relationship means adjusting the display angle of the display content in accordance with the preset mapping relation. Taking the clamshell electronic device shown in FIG. 18 as an example (it is the same principle for the clamshell electronic device shown in FIG. 19), as shown in FIG. 18, the adjusting the display angle of the content means adjusting the angle of the content relative to the screen. Specifically, in FIG. 20 (a), the font direction of the content is toward the upper edge of the screen, after adjusting the display angle of the content, as shown in FIG. 20 (b), the font direction of the content is toward the right edge of the screen.

The preset mapping relationship is used to indicate the correspondence relationship between the spatial parameter value and the display angle, the preset mapping relationship can be preset in the electronic device by the manufacturer, can also be newly set by the user according to the usage habits, in the embodiment of the disclosure, there is no limitation to the setting of the correspondence relationship between the spatial parameter value and the display angle.

Figure 21:
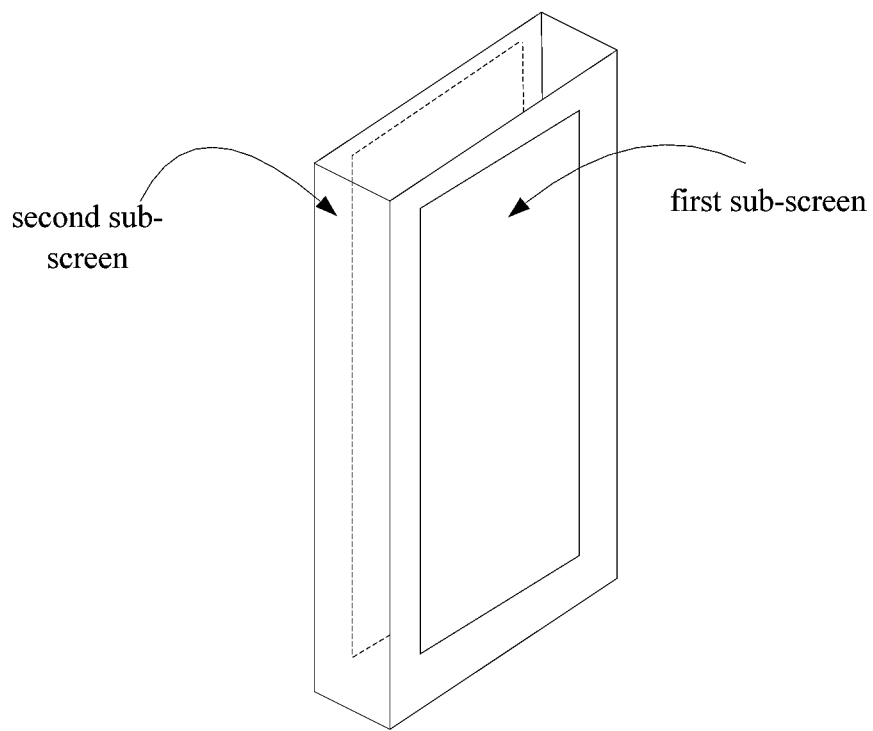
FIG. 21 is a schematic diagram illustrating the display of a screen in the seventh embodiment of the disclosure.

Particularly, for the transparent screen electronic device, the adjusting the display of the target object on the screen according to the spatial parameter value further includes: adjusting the display direction of the content according to the spatial parameter value. The transparent screen means that two screens are provided respectively on the electronic device at two opposite sides thereof, and the two screens have the same size and properties, the position of the two screens relative to the electronic device is the same except that one is on the front of the electronic device and the other is on the back of the electronic device, and the light transmittance of the two screens relative to each other can reach the industry-recognized light transmittance limit of the transparent screen. Taking the bar shaped mobile phone as an example, as shown in FIG. 21, the first sub-screen and the second sub-screen are respectively provided on the both sides of the electronic device, and their size are the same and the light transmittance relative to each other reaches industry limits.

Figure 22:
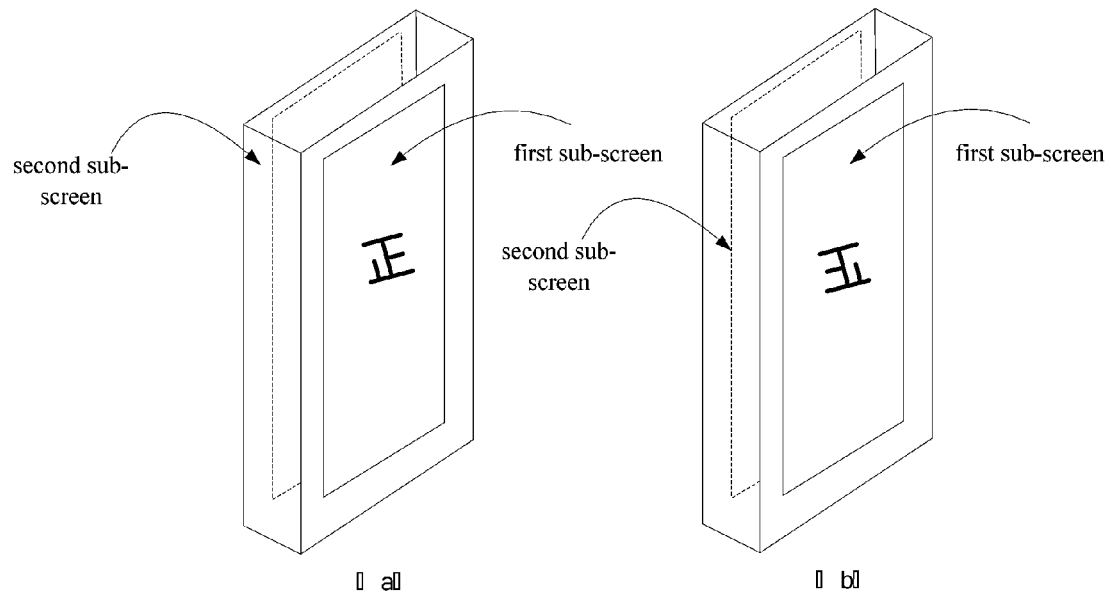
FIG. 22 is a schematic diagram illustrating the display of a screen in the seventh embodiment of the disclosure.

The adjusting the display direction of the content according to the spatial parameter value includes: adjusting the display direction of the content according to the spatial parameter value acquired in step 701 in accordance with the preset mapping relationship. Specifically, as shown in FIG. 22, taking the bar shaped electronic device, for example as an example. In FIG. 22 (a), the display direction of the content is the normal direction display with respect to the first sub-screen (i.e., the reversed display direction with respect to the second sub-screen), after the display direction of the content is adjusted according to the spatial parameter value in accordance with the preset mapping relationship, as shown in FIG. 22 (b), the display direction of the content is changed as follows: the display direction of the content is a reversed display direction for the first sub-screen (i.e., a normal direction display for the second sub-screen).

The preset mapping relationship is used to indicate the correspondence relationship between the spatial parameter value and the display direction, the preset mapping relationship can be preset in the electronic device by the manufacturer, can also be newly set by the user according to the usage habits, in the embodiment of the disclosure, there is no limitation to the setting of the correspondence relationship between the spatial parameter value and the display direction.

The above way to achieve the adjustment of the display of the target object on the screen is illustrated by taking the bar shaped electronic device, for the clamshell electronic device, the way to achieve the adjustment of the display of the target object on the screen is the same as the above way, which will not be described in detail herein.

It should be noted that, the adjusting the display of the target object on the screen according to the spatial parameter value does not change the content of the display object, the content of the display object is based on the data content stored in the electronic device and the data content acquired from the external.

In the method for the display of the screen provided by the embodiment of the disclosure, the spatial parameter value of the electronic device can be acquired and the display angle of the display object can be adjusted according to the spatial parameter value, thus facilitating the viewing of the user to the content. In addition, for the transparent screen electronic device, it is also possible to adjust the display direction of the display object according to the spatial parameter value, so that the user can view the content easily in its normal display direction after flipping the screen, thus improving the user experience.

Figure 23:
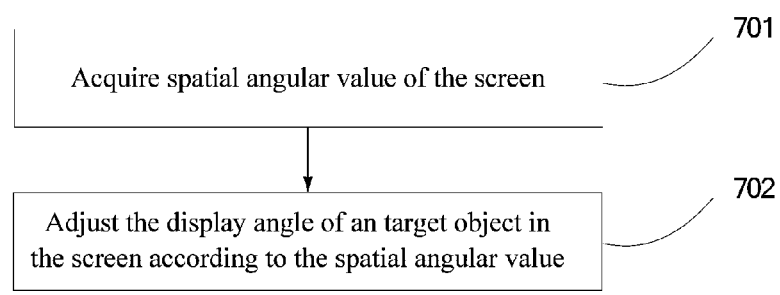
FIG. 23 is a flowchart of a display method provided by an eighth embodiment of the disclosure.

Further, an eighth embodiment of the disclosure provides a display method. As shown in FIG. 23, the method of eighth embodiment includes step 801 and step 802.

801, acquiring the spatial angle value.

Figure 24:
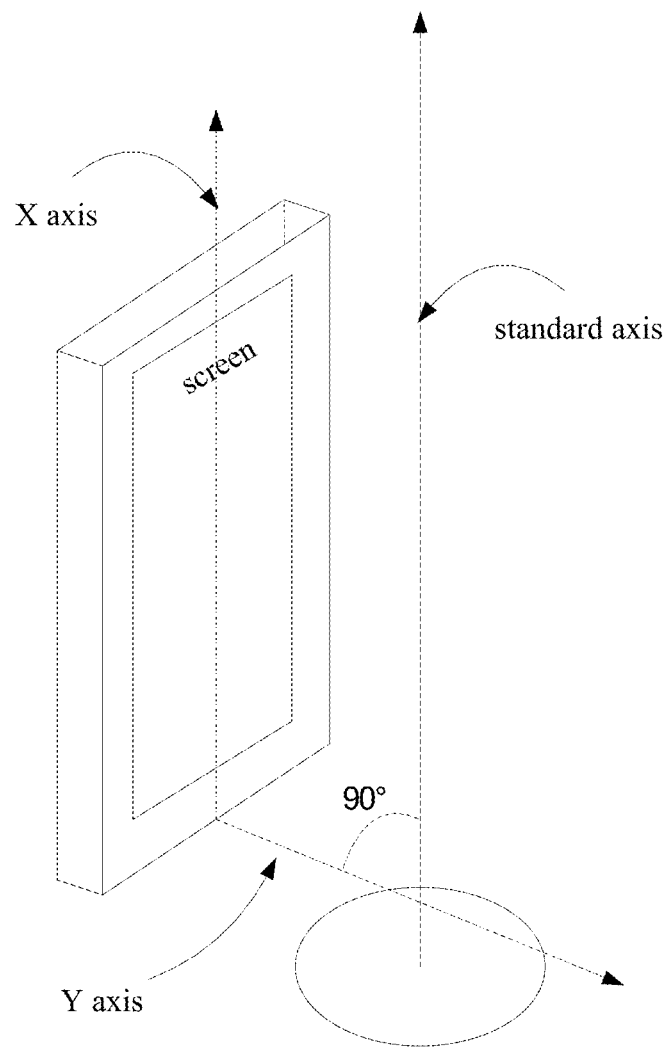
FIG. 24 is a schematic diagram of the display of a screen in the eighth embodiment of the disclosure.

For the bar shaped electronic device shown in FIG. 18, the spatial angle value of the electronic device can be acquired by an angle sensor provided on the electronic device, and the spatial angle value is the angle difference value of the current special position of the electronic device relative to the preset reference system. For example, as shown in FIG. 24, the long-side direction of the bar shaped electronic device is set as the X-axis direction, and the direction perpendicular to both the long-side direction and the short-side direction of the bar shaped electronic device is the Y-axis direction. When the current spatial position of the electronic device is shown in FIG. 24, the angle between the X-axis of the electronic device and the standard axis is 0°, the angle between the Y-axis and the standard axis is 90°. Acquiring the spatial angle value of the electronic device means acquiring the angle between the X-axis and the stand axis and the angle between the Y-axis and the stand axis.

The screen of the bar shaped electronic device is arranged on the electronic device, thus acquiring the spatial angle value of the screen means obtaining the spatial angle value of the electronic device. The angle sensor can be arranged on the housing of the electronic device or arranged inside the electronic device. In addition, the position of the angle sensor on (or in) the electronic device does not affect the effect of acquiring the spatial angle value of the screen, the angle sensor can be arranged at any position, and the embodiment of the disclosure makes no limitation to this.

For the clamshell electronic device show in FIG. 19, the implementation way to acquire the spatial angle value of the screen is the same as that of the bar shaped electronic device, which will not be described in detail herein. In addition, for the clamshell electronic device, the angle sensor is arranged on (or in) the first body, i.e. it is arranged on the body including the screen, the position of the angle sensor on the first body does not affect the effect of acquiring the spatial angle value of the screen, the angle sensor can be arranged at any position, and the embodiment of the disclosure makes no limitation to this.

In addition, it is also possible to acquire the three-axis pressure component value of the screen in a preset three-dimensional coordinate space by a gravity sensor, obtain the three-axis angle component value according to a preset mapping relationship between the pressure value and the angle value, thus obtaining the spatial angle value of the screen.

Further, for the clamshell electronic device shown in FIG. 19, the acquiring the spatial angle value of the screen further includes: acquiring the spatial angle value of the screen relative to a preset reference object. The preset reference object is the second body, the angle sensor is arranged on the hinge connecting the first body and the second body. The angle sensor acquires the number of rotations of the first body with respective to the second body, obtain the angle difference between the first body and the second body, thus obtain the spatial angle value.

Figure 25:
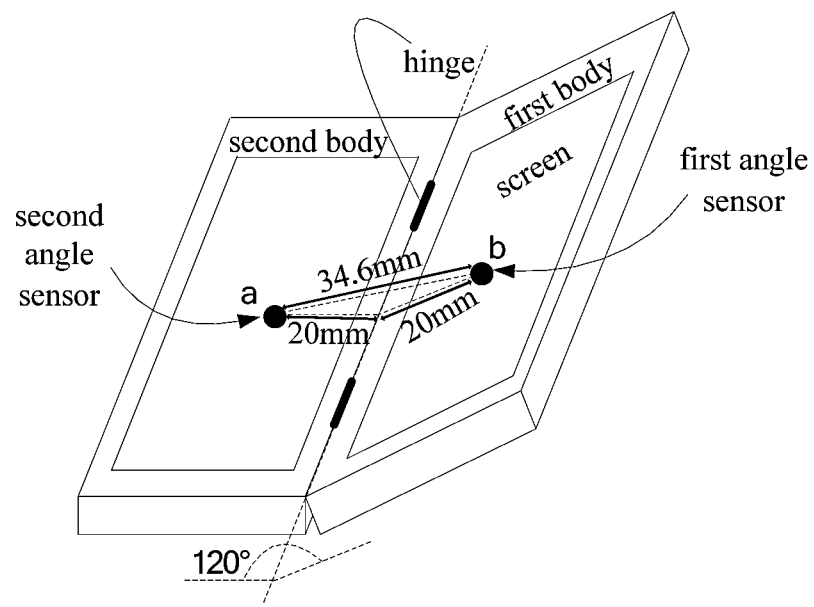
FIG. 25 is a schematic diagram of the display of a screen in the eighth embodiment of the disclosure.

Further, the angle sensor is divided into a first angle sensor and a second angle sensor, and the first angle sensor and the second angle sensors are respectively arranged on the first body and the second body. As shown in FIG. 25, the positions of the first angle sensor (a) and the second angle sensor (b) are symmetrical relative to the longitudinal axis where the hinge lies. The first angle sensor acquires the linear distance between the first and second angle sensors by sensing the second angle sensor, i.e. the distance between a and b in FIG. 25. Then the angle difference between the first body and the second body is calculated by the law of cosines in conjunction with the known vertical distance from a to the longitudinal axis where the hinge lies and the known vertical distance from b to the longitudinal axis where the hinge lies. Specifically, in FIG. 25, the distance between a and b is 34.6 mm (millimeter), each of the vertical distance from a to the longitudinal axis where the hinge lies and the vertical distance from b to the longitudinal axis where the hinge lies is 20 mm. According to the law of cosines ($X^2 = Y^2 + Z^2 - 2 \cdot Y \cdot Z \cdot \cos A$, where $Y^2$ and $Z^2$ are respectively the square of the vertical distance from a to the longitudinal axis where the hinge lies and the square of the vertical distance from b to the longitudinal axis where the hinge lies, $X^2$ is the square of the distance between a and b), the cosine value of the angle between the first body and the second body can be calculated, which is −0.5, thus the angle (i.e., angle A) between the first body and the second body can be obtained, which is 120°.

Figure 26:
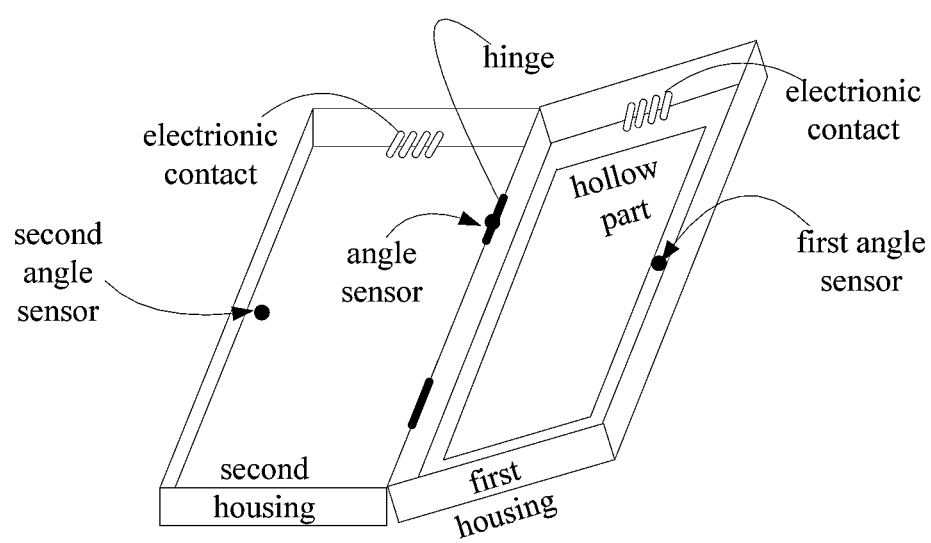
FIG. 26 is a schematic diagram of the display of a screen in the eighth embodiment of the disclosure.

Furthermore, for the electronic device in which the screen and the body of the electronic device are separated, as shown in FIG. 26, the screen and the electronic device are respectively embedded into the first housing and the second housing, and are used in a wireless transmission mode. The first angle sensor and the second angle sensor are arranged on the first housing and the second housing, respectively, and their position is the same with that shown in FIG. 25, which will not be described in detail herein. The first angle sensor and the second angle sensor obtains the angle difference between the screen and the electronic device by obtaining the angle difference between the first housing and the second housing, the electronic device obtains the angle difference by the electrical contacts disposed on the housing. Or, the angle sensor is arranged on the hinge connecting the first housing and the second housing to obtain the angle difference between the screen and electronic device.

Optionally, the first angle sensor and the second angle sensor shown in FIG. 25 or FIG. 26 also can acquire the relative angle values of the screen and the reference object (the second body in FIG. 25 or the electronic device in FIG. 26) relative to the preset reference system and obtain the angle difference between the first body and the second body or between the screen and the electronic device by obtaining the difference between the two relative angle value.

802, adjusting the display angle of the target object on the screen according to the spatial angle value.

The display angle of the target object is adjusted relative to the display angle before the adjustment, the direction that the font direction of the content is towards the upper edge of the screen can be set as the initial display angle, the adjustment of the display angle of the target object begins from the initial display angle, rotating clockwise or counterclockwise.

For the bar shaped electronic device shown in FIG. 18, the angle of the content can be adjusted in accordance with the mapping relationship in the Table 1, where the dependent variable is the angle difference between the screen and the reference system. In the embodiment of the disclosure, the dependent variable is the angle between the X-axis (the axis where the long side of the electronic device lies) and the standard axis.

TABLE 1

| Dependent variable | Display angle (initial relative display angle) |
|---|---|
| 0° | 0° |
| 45° | 45° |
| 90° | 90° |
| 135° | 135° |
| 180° | 180° |
| 225° | 225° |
| 270° | 270° |
| 315° | 315° |
| 360° | 360° |

Figure 27:
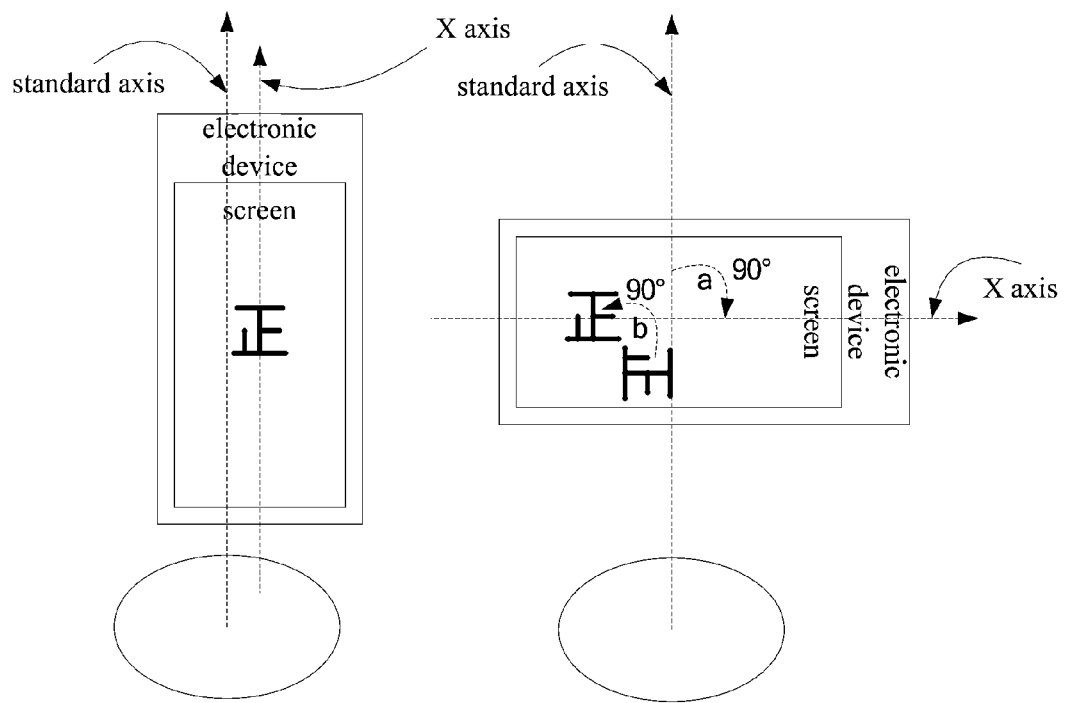
FIG. 27 is a schematic diagram of the display of a screen in the eighth embodiment of the disclosure.

The effect of the change of the display angle caused by the respective dependent variable is shown in FIG. 27 (taking the dependent variable being 90° as an example). It should be noted that, the angle measurement direction of the dependent variable in Table 1 should be opposite to the adjustment direction of the display angle. For example, if the dependent variable is the changing value of the angle which rotates from the standard axis to the X-axis in a clockwise direction (i.e., the direction as denoted in FIG. 27), the display angle is the angle which rotates from the initial display angle in a counterclockwise direction (i.e. the direction b denoted in FIG. 27).

Figure 28:
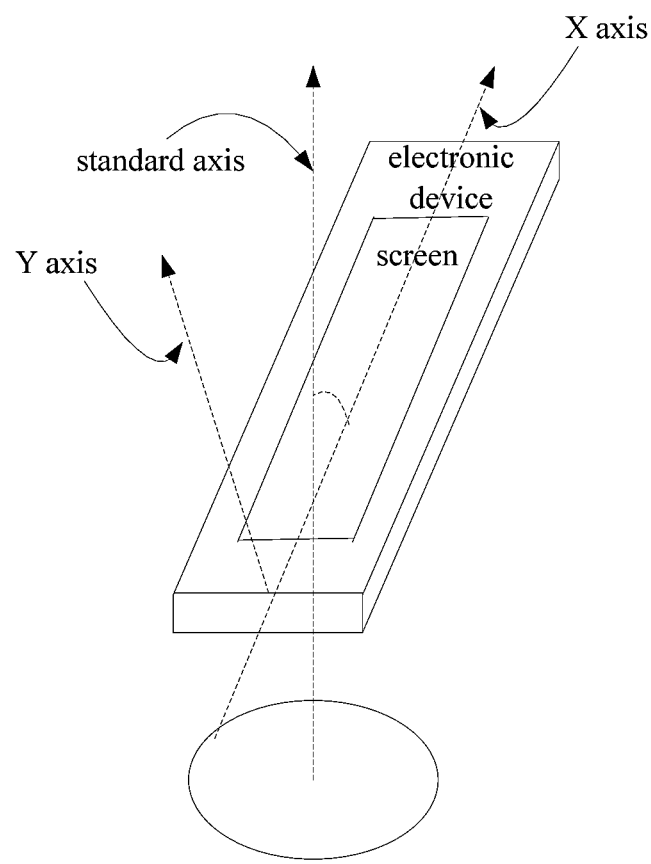
FIG. 28 is a schematic diagram of the display of a screen in the eighth embodiment of the disclosure.

Also, in order to avoid the case in the FIG. 28 that although there exists angle difference between the X-axis and the standard axis, it does not need to adjust the display angle, the angle between the Y-axis and the standard axis can be added in the mapping relationship rules, i.e. when the angle between the Y-axis and the standard axis keeps at 90°, shown in Table 1 in accordance with the correspondence relationship adjustment angle, the display angle is adjusted in accordance with the mapping relationship shown in Table 1, and when the angle between the Y-axis and the standard axis is not 90°, no adjustment is made to the display angle.

For the clamshell electronic device shown in FIG. 19, the angle of the content can be adjusted in accordance with the mapping relationship shown in Table 2. It should be noted that the dependent variable in Table 2 is the angle difference between the screen and the reference object. In the embodiment of the disclosure, the dependent variable is the angle difference between the first body and the second body or between the first housing and the second housing, which is different from the dependent variable in Table 1.

TABLE 2

| Dependent variable | Display angle (initial relative display angle) |
|---|---|
| 0° | 0° |
| 45° | 45° |
| 90° | 90° |
| 135° | 135° |
| 180° | 180° |
| 225° | 225° |
| 270° | 270° |
| 315° | 315° |
| 360° | 360° |

Figure 29:
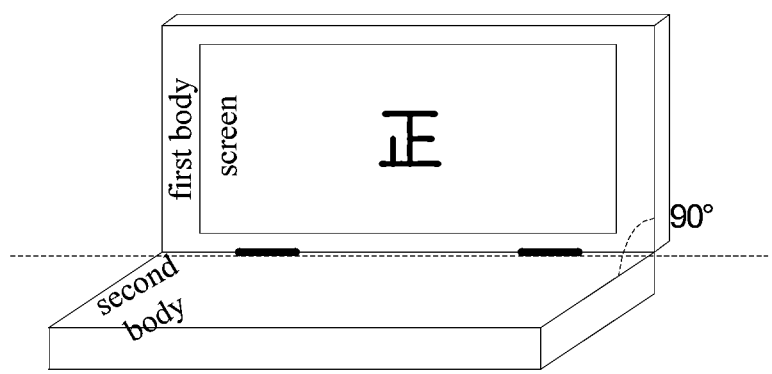
FIG. 29 is a schematic diagram of the display of a screen in the eighth embodiment of the disclosure.

The effect of the change of the display angle caused by the dependent variable in Table 2 is shown in FIG. 29 (taking the dependent variables of 90° as an example).

Further, for the clamshell electronic device shown in FIG. 19, the display angle can also be adjusted according to the angle between the screen and the reference system (i.e., the angle between the X-axis and the standard axis) in accordance with the mapping relationship. The specific implementation way can refer to the implementation way of adjusting the display angle of the bar shaped electronic device, which will not be described in detail herein.

Furthermore, a first margin threshold can be preset when adjusting the display angle according to Table 1 or Table 2, the first margin threshold may be 5°. During adjusting the display angle, when the dependent variable is greater than the sum of the limit value in the mapping relationship and the first margin threshold, the display content is adjusted in accordance with the display angle corresponding to the limit value. For example, when the dependent variable reaches 90°, the display angle maintains 45° (the display angle when the dependent variable is 45°), only when the dependent variable is greater than 95°, the display angle is adjusted to 90° from 45°.

The mapping relationship used in the adjustment of the display angle of the display content in the embodiment of the disclosure can be one of a variety of available mapping relationship, and the practical application is not limited to this. Moreover, in practical applications, the granularity of the mapping relationship can reach 10°, 5°, or the display angle may be adjusted continuously based on the continuous change of the dependent variable, the embodiment of the disclosure makes no limitation to the granularity of the mapping relationship.

Figure 30:
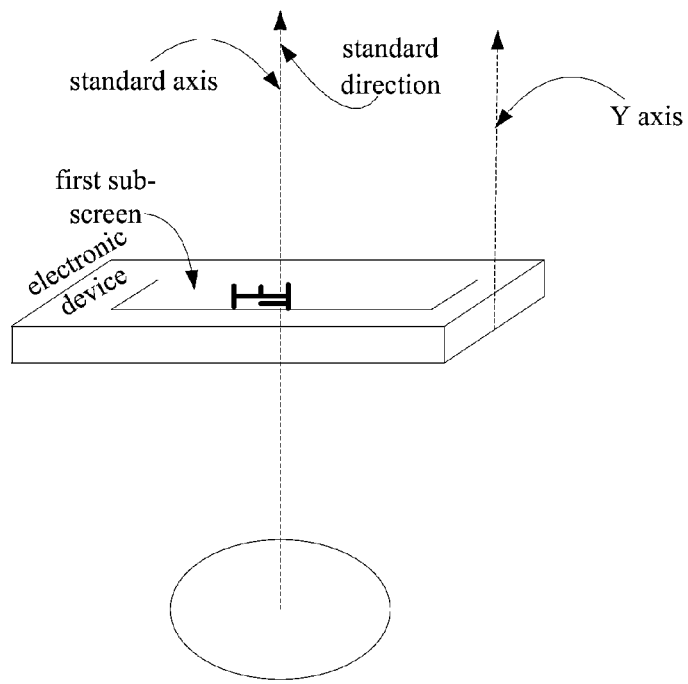
FIG. 30 is a schematic diagram of the display of a screen in the eighth embodiment of the disclosure.

In an application scenario of the embodiment of the disclosure, when the screen is a transparent screen, the display direction of the screen can be adjusted according to the spatial angle value. For example, as shown in FIG. 30, the upward direction of the standard axis relative to the seal level is set as the standard direction. When the electronic device is flipped so that the Y-axis is parallel to the standard axis (as shown in FIG. 30), the display direction of the first sub-screen toward the standard direction is set to be the normal display direction (in this case, the display direction of the second sub-screen facing away from the standard direction is the reversed display), when the user views the first sub-screen, the display content is in a normal display state for the user. For a special case in which the user uses the electronic device during lying down, the display direction of the first sub-screen toward the standard direction can be set as the reversed display (in this case, the display direction of the second sub-screen facing away from the standard direction is the normal display), thereby meeting the different needs of different users.

Figure 31:
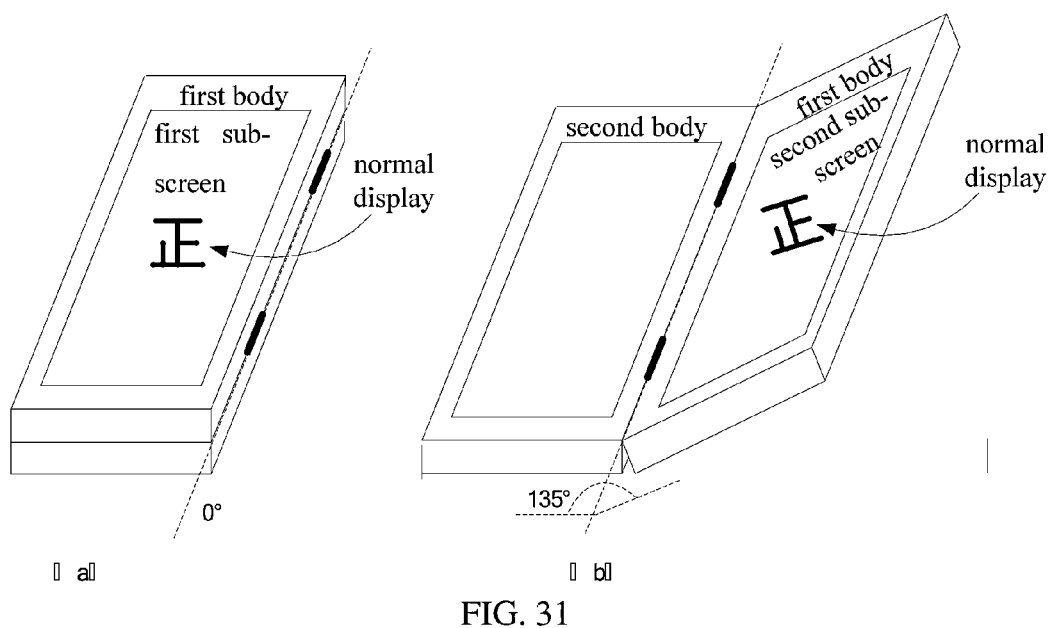
FIG. 31 is a schematic diagram of the display of a screen in the eighth embodiment of the disclosure.

Further, when the obtained spatial angle value is the relative angle value of the screen of the clamshell electronic device relative to the reference object, the adjusting the display direction of the screen according to the spatial angle value further includes: adjusting the display direction according to the preset mapping relationship. The mapping relationship is used indicate the correspondence relationship between the relative angle value and the display direction. As shown in Table 3, the dependent variable is the relative angle value, and the display direction is based on the direction that the user views the first sub-screen. The display effect is shown in FIG. 31 (taking the dependent variable of 135° as an example).

TABLE 3

| Dependent variable | Display direction (based on the viewing of first sub-screen) |
| --- | --- |
| 0° | Normal display |
| 90° | Reversed display |
| 180° | Normal display |
| 270° | Reversed display |
| 360° | Reversed display |

Furthermore, a second margin threshold can be preset when adjusting the display direction according to Table 3, the second margin threshold may be 10°. During adjusting the display direction, when the dependent variable is greater than the sum of the limit value in the mapping relationship and the second margin threshold, the display content is adjusted according to the display direction corresponding to the limit value. For example, when the dependent variable reaches 90°, the first sub-screen still maintains the normal display, only when the dependent variable is greater than 95°, the display direction of the first sub-screen is adjusted to the reversed display.

In the method for the display of the screen provided by the embodiment of the disclosure, the spatial parameter value of the electronic device can be acquired and the display angle of the display object can be adjusted according to the spatial parameter value, thus facilitating the viewing of the user to the display content. In addition, for the transparent screen electronic device, it is also possible to adjust the display direction of the display object according to the spatial parameter value, so that the user can view the display content easily in a normal display direction after flipping the screen, thus improving the user experience.

Figure 32:
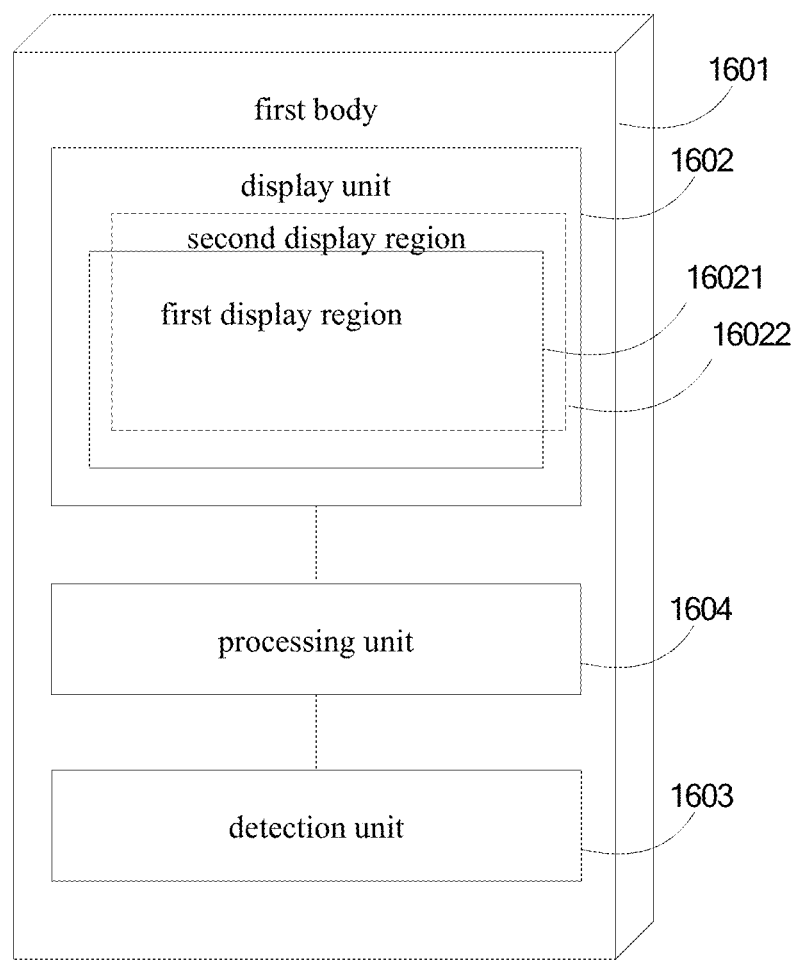
FIG. 32 is a schematic structure diagram of an electronic device in a ninth embodiment of the disclosure.
Figure 33:
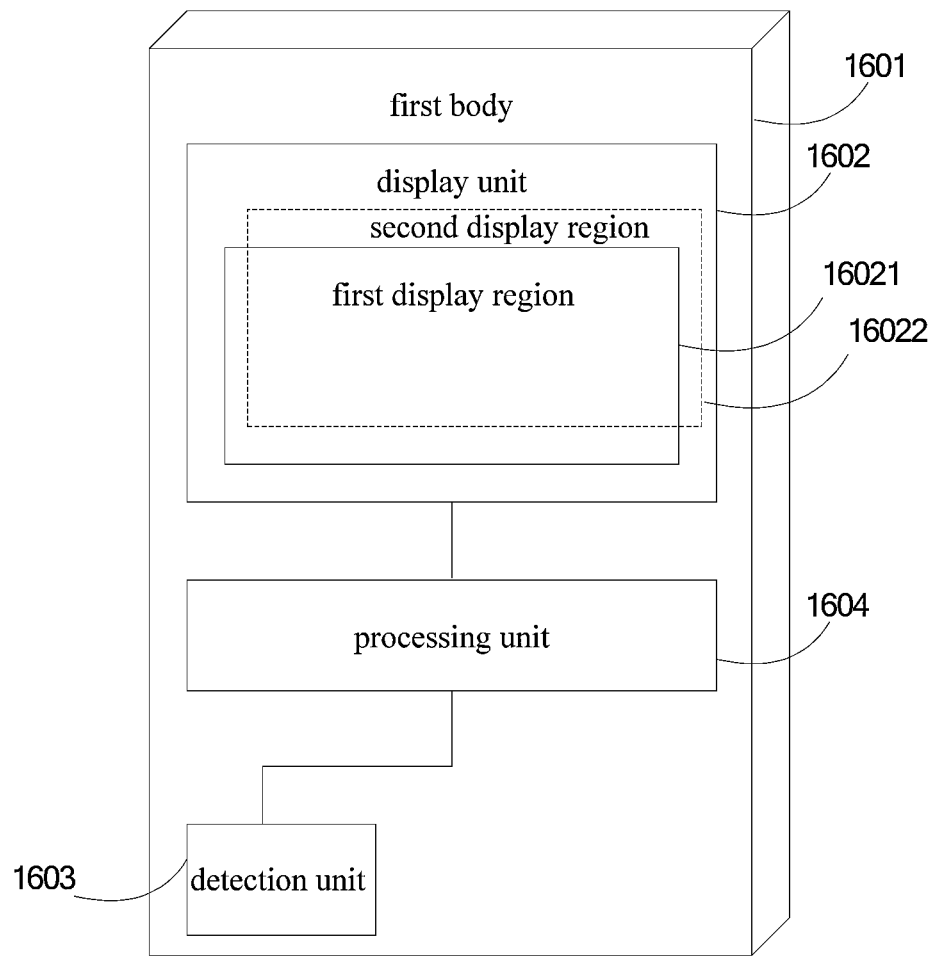
FIG. 33 is a schematic structure diagram of an electronic device in the ninth embodiment of the disclosure.

Referring to the implementation of the embodiment of the method in FIG. 23, a ninth embodiment of the disclosure provides an electronic device as shown in FIG. 32, for implementing the embodiment of the method shown in FIG. 23, the electronic device includes: a first body 1601, a display unit 1602, a detection unit 1603, and a processing unit 1604.

The display unit 1602 is arranged on the first body 1601, the display unit 1602 include: a first display region 16021 and a second display region 16022, the first display region 16021 is located on a first side of the first body 1601, the second display region 16022 is located at a second side of the first body 160, the first side and the second side are opposite sides.

The detection unit 1603 is adapted to acquire the spatial angle value of the display unit 1602.

For the bar shaped electronic device, the spatial angle value of the electronic device can be acquired by a detection unit 1603 arranged on the electronic device. The spatial angle value is the angle difference between the current spatial position of the electronic device and the preset reference system. For example, the long-side direction of the bar shaped electronic device is set as the x-axis direction, and a direction perpendicular to both the longs-side direction and the width-side direction of the bar shaped electronic device is set as the Y-axis direction. The obtaining the spatial angle value of the display unit 1602 means obtaining the value of the angle between the X-axis and the standard axis and the value of the angle between the Y-axis and the standard axis.

In addition, the detection unit 1603 can also acquire the three-axis pressure component value of the display unit 1602 in the preset three-dimensional coordinate space by gravity sensing, acquire the three-axis angle component value according to the preset mapping relationship between the pressure value and the angle value, and thus obtain the spatial angle value of the display unit 1602.

The processing unit 1604 is connected with the detection unit 1603, for adjusting the display of the target object on the display unit 1602 according to the spatial angle value acquired by the detection unit 1603.

Further, the light transmittance of the first display region 16021 to the second display region 16022 and the light transmittance of the second display region 16022 to the first display region 16021 meet the preset light transmittance threshold. The preset light transmittance threshold can be 60-80%.

Further, as shown in FIG. 17, the detection unit 1603 is arranged on the first body 1601 for acquiring the relative spatial angle value of the first body 1601 and the preset reference system.

In the bar shaped electronic device, the display unit 1602 is arranged on the electronic device, therefore, the acquiring the spatial angle value of the display unit 1602 means acquiring the spatial angle value of the electronic device. The detection unit 1603 can be arranged on the housing of the electronic device or arranged in the electronic device. In addition, the position of the detection unit 1603 on (or in) the electronic device does not affect the effect of acquiring the spatial angle value of the display unit 1602, the detection unit 1603 can be arranged in any position, and the embodiment of the disclosure makes no limitation to the position.

Figure 34:
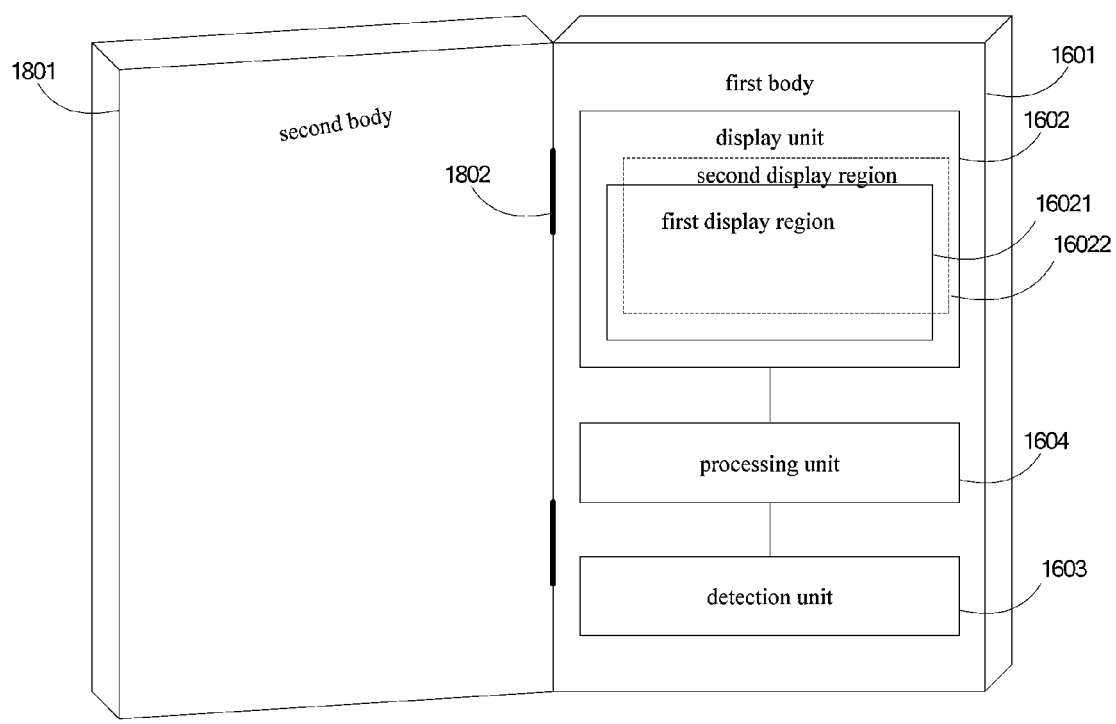
FIG. 34 is a schematic structure diagram of an electronic device in the ninth embodiment of the disclosure.
Figure 35:
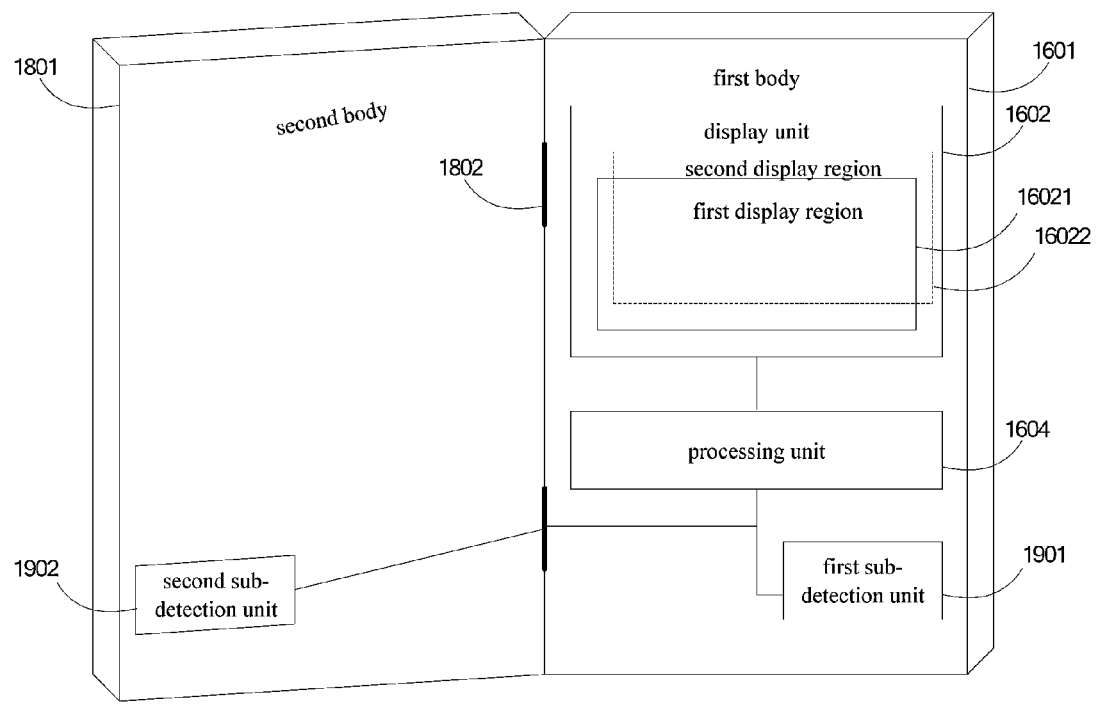
FIG. 35 is a schematic structure diagram of an electronic device in the ninth embodiment of the disclosure.

Further, as shown in FIG. 34, the electronic device further includes:

a second body 1801, the first body 1601 and the second body 1801 being connected via a hinge 1802.

Further, the detection unit 1603 is arranged on the hinge 1802, for acquiring the relative spatial angle value of the first body 1601 and the second body 1801.

Further, for the clamshell electronic device, the detection unit 1603 is also adapted to obtain the spatial angle value of the display unit 1602 relative to the preset reference object. The preset reference object 1801 is the second body, the detection unit 1603 is arranged on the hinge 1802 connecting the first body and the second body. The detection unit 1603 acquires the number of rotations of the first body 1601 relative to the second body 1801, obtains the angle difference between the first body 1601 and the second body 1602, and thus obtains the spatial angle value.

Further, the detection unit 1603 is arranged on the first body 1601 for acquiring the relative spatial angle value between the first body 1601 and the second body 1801.

Further, as shown in FIG. 19, the detection unit 1601 includes a first sub-detection unit 1901 and a second sub-detection unit 1902.

The first sub-detection unit 1901 and the second sub-detection unit 1902 are located on the first body 1601 and the second body 1801, respectively. The first sub-detection unit 1901 and the second sub-detection unit 1902 are symmetrical relative to the axis where the hinge 1802 lies.

Further, the detection unit 1601 is adapted to acquire the distance between the first sub-detection unit 1901 and the second sub-detection unit 1902, and acquire the relative spatial angle value between the first body 1601 and the second body 1801 based on this distance and the distances from the first sub-detection unit 1901 and the second sub-detection unit 1902 to the axis where the hinge 1802 lies.

The first sub-detection unit 1901 acquires the linear distance between the first sub-detection unit 1901 and the second sub-detection unit 1902 by sensing the second sub-detection unit 1902 the second sub-detection unit 1902, then calculate the angular difference between the first body 1601 and the second body 1801 by Law of Cosines in conjunction with the known vertical distance from the first diction unit 1901 to the longitudinal axis where the hinge 1802 lies and the known vertical direction from the second detection unit 1902 to the longitudinal axis where in the hinge 1802 lies.

Further, the first sub-detection unit 1901 is adapted to acquire the first sub-relative spatial angle value of the first body 1601 and a preset reference system.

The second sub-detection unit 1902 is adapted to acquire the second sub-relative spatial angle value of the second body 1801 relative to the preset reference system.

The detection unit 1603 is adapted to acquire the relative spatial angle value of the first body 1601 and the second body 1801 based on the first sub-relative spatial angle value and the second sub-relative spatial angle value.

The first sub-detection unit 1901 and the second sub-detection unit 1902 can also be adapted to acquire the relative angle values of the display unit 1602 and the reference object relative to the preset reference system respectively. The detection unit 1603 obtains the angle difference between the first body 1601 and the second body 1801 by obtaining the difference between the two relative angle values.

Further, the processing unit 1604 is specifically adapted to adjust the display angle of the target object in the display unit 1602 based on the spatial angle value and the preset mapping relationship.

The display angle of the target object is adjusted relative to the display angle before the adjustment, the direction that the font direction of the display content is towards the upper edge of the display unit 1602 can be set as the initial display angle, the adjustment of the display angle of the target object begins from the initial display angle, rotating clockwise or counterclockwise.

For the bar shaped electronic device, the angle of the display content can be adjusted in accordance with the mapping relationship in the Table 1, where the dependent variable is the angle difference between the screen 1602 and the reference system. In the embodiment of the disclosure, the dependent variable is the angle between the X-axis (the axis where the long side of the electronic device lies) and the standard axis.

It should be noted that, the angle measurement direction of the dependent variable in Table 1 should be opposite to the adjustment direction of the display angle. For example, if the dependent variable is the changing value of the angle which rotates from the standard axis to the X-axis in a clockwise direction, the display angle is the angle which rotates from the initial display angle in a counterclockwise direction.

For the clamshell electronic device, the angle of the display content can be adjusted in accordance with the mapping relationship shown in Table 2. It should be noted that the dependent variable in Table 2 is the angle difference between the screen 1602 and the reference object. In the embodiment of the disclosure, the dependent variable is the angle difference between the first body 1601 and the second body 1801, which is different from the dependent variable in Table 1.

Further, the processing unit 1604 is also adapted to adjust the display angle of the target object in the display unit 1602 based on the spatial angle value and the mapping relationship when the spatial angle value is greater than the sum of the limit value in the mapping relationship and the first margin threshold.

The first margin threshold may be 5°. During adjusting the display angle, when the dependent variable is greater than the sum of the limit value in the mapping relationship and the first margin threshold, the display content is adjusted by the display unit 1602 in accordance with the display angle corresponding to the limit value. For example, when the dependent variable reaches 90°, the display angle maintains 45° (the display angle when the dependent variable is) 45°, only when the dependent variable is greater than 95°, the display angle is adjusted to 90° from 45°.

Further, the processing unit 1604 is further adapted to adjust the display direction of the target object in the first display region 16021 and the second display region 16022 based on the spatial angle value and the preset mapping relationship.

The processing unit 1604 can be further adapted to adjust the display direction according to the spatial angle value. When the spatial angle value acquired by the detection unit 1603 is the relative angle value of the first body 1601 relative to the second body 1801, the processing unit 1604 can adjust the display direction of the display unit 1602 according to the preset mapping relationship. The mapping relationship is used indicate the correspondence relationship between the relative angle value and the display direction. As shown in Table 3, the dependent variable is the relative angle value, and the display direction is based on the direction that the user views the first sub-display region 16021.

In addition, the direction of the standard axis relative to the sea level can be set as the standard direction. When the electronic device is flipped so that the Y-axis is parallel to the standard axis, the processing unit 1604 can set the display direction of the first display region 16021 towards the standard direction as the normal display (in this case, the display direction of the second display region 16022 facing away from the standard direction is the reversed display), when the user views the first display region 16021, the display content is in a normal display state for the user. For a special case in which the user uses the electronic device during lying down, the display direction of the first display region 16021 towards the standard direction can be set as the reversed display (in this case, the display direction of the second display region 16022 facing away from the standard direction is the normal display), thereby meeting the different needs of different users.

The processing unit 1604 is further adapted to adjust the display direction of the target object in the first display region 16021 and the second display region 16022 based on the spatial angle value and the mapping relationship when the spatial angle value is greater than the sum of the limit value in the mapping relationship and the second margin threshold.

Further, a second margin threshold can be preset when adjusting the display direction according to Table 3, the second margin threshold may be 10°. During adjusting the display direction, when the dependent variable is greater than the sum of the limit value in the mapping relationship and the second margin threshold, the display content is adjusted by the processing unit 1604 according to the display direction corresponding to the limit value. For example, when the dependent variable reaches 90°, the first display region 16021 still maintains the normal display, only when the dependent variable is greater than 95°, the display direction of the first display region 16021 is adjusted to the reversed display.

The mapping relationship used in the adjustment of the display angle of the display content in the embodiment of the disclosure can be one of a variety of available mapping relationship, and the practical application is not limited to this. Moreover, in practical applications, the granularity of the mapping relationship can reach 10°, 5°, or the display angle and/or display direction may be adjusted continuously based on the continuous change of the dependent variable, the embodiment of the disclosure makes no limitation to the granularity of the mapping relationship. In addition, the embodiment is illustrated by taking the spatial angle value as the spatial parameter value, in practical applications, the space parameter value includes but not limited to the special gravity value, the embodiment makes no limitation to the parameter which can be used as the special parameter value to adjust the display effect of the display object.

The electronic device described in the embodiment includes but not limited to the bar shaped, slider, clamshell (including side flipped) type mobile phones and panel computers. All the electronic devices which have the display function and a strong mobility should be included in the scope of the electronic device described in the embodiment of the disclosure.

In the electronic device provided by the embodiment of the disclosure, the spatial parameter value can be acquired and the display angle of the display object can be adjusted according to the spatial parameter value, thus facilitating the viewing of the user to the display content. In addition, for the transparent screen electronic device, it is also possible to adjust the display direction of the display object according to the spatial parameter value, so that the user can view the display content easily in a normal direction after flipping the screen, thus improving the user experience.

Those skilled in the art should understand that the embodiment of the disclosure can be embodied as methods, systems, or computer program products. Accordingly, the invention can adopt the forms of a pure hardware embodiment, a pure software embodiment, or a combination of software and hardware. Moreover, the invention can adopt a form of a computer program product which is implemented on one or more computer usable storage media (including but not limited to a disk storage, and an optical memory, etc.) containing the computer usable program code.

The invention is described with reference to the method, device (system), and the flowchart and/or block diagram of a computer program product according to the embodiments of the disclosure. It should be understood that each flowchart and/or block diagram of the flowcharts and/or block diagrams or a combination thereof can be achieved by computer program instructions. These computer program instructions can be supplied to a general purpose computer, a special purpose computer, an embedded processor or other programmable data processing apparatus to produce a machine, so that a device for implementing one or more flows in the flowcharts and/or functions specified in one or more of the block diagrams can be produced by means of the instructions executed by the computer or other programmable data processing apparatus.

These computer program instructions can also be stored in a computer-readable memory that can direct a computer or other programmable data processing apparatus to work in a specific manner, so that the instructions stored in the computer readable memory generates manufactured articles including the instruction device which implements one or more flows in the flowcharts and/or the functions specified in one or more of the block diagrams.

These computer program instructions can also be loaded to a computer or other programmable data processing apparatus, so that a series of operation steps are executed on the computer or other programmable apparatus to produce the computer-implemented processing, thus enabling the instructions executed on the computer or other programmable apparatus to provide steps for implementing one or more flows in the flowchart and/or functions specified by one or more of the block diagrams.

Clearly, those skilled in the art can make various modifications and variations to the disclosure without departing from the spirit and scope of the invention. Therefore, the modifications and variations shall fall within the scope the invention.

The invention claimed is:

1. A display method, applicable to electronic device, the electronic device comprising at least one display unit, the at least one display unit comprising a first display region and a second display region, the first display region and the second display region are physically disposed on a single screen or are physically disposed on different screens connected to each other via rotary connector, and the first display region and the second display region being in different planes, the method comprising:
acquiring display region selection information, and determining a target display region from the first display region and the second display region according to the display region selection information; and
acquiring content to be displayed in a target display region, and displaying, according to the determined target display region and a preset display strategy, the content to be displayed on the target display region, wherein the content is capable of being displayed on the first display region and is capable of being displayed on the second display region,
wherein acquiring display region selection information, and determining a target display region comprises:
detecting one or more of the first display region and the second display region that face a user of the electronic device;
determining the one or more regions facing the user as the target display region;
detecting a contact area between an operating body and the first display region and a contact area between the operating body and the second display region to obtain a first contact area and a second contact area;
comparing the first contact area and the second contact area; and determining the target display region according to the comparison result.

2. The method according to claim 1, wherein, before the acquiring the display region selection information, the method further comprises:
generating a trigger instruction when the electronic device switches from a first power consumption state to a second power consumption state, the trigger instruction being used to trigger a detection module arranged in the electronic device to start up to acquire the display region selection information,
wherein a first power consumption of the electronic device in the first power consumption state is lower than a second power consumption of the electronic device in the second power consumption state.

3. The method according to claim 1, further comprising:
re-determining a target display region from the first display region and the second
display region when detecting a switching instruction for controlling target display region switch; and
displaying, according the re-determined target display region and the preset display strategy, the content to be displayed on the target display region.

4. The method according to claim 3, wherein one of the first display region and the second display region is the target display region and the other is a non-target display region; and wherein, before the re-determining a target display region from the first display region and the second display region when detecting a switching instruction for controlling target display region switch, the method further comprises:
detecting whether a detection and scan region in the front of the first display region and a detection and scan region in the front of the second display region contain image information of a user, and generating the switching instruction if the detection result shows that it is needed to perform target display region switch; or
detecting a contact area between an operating body and the first display region and a contact area between the operating body and the second display region to obtain a first contact area and a second contact area, comparing the first contact area and the second contact area, comparing the obtained current comparison result with a stored previous comparison result to obtain a comparison value, determining whether the comparison value is greater than a first threshold, and generating the switching instruction if it is determined that the comparison value is greater than the first threshold; or
detecting spatial position information of the first display region and the second display region, comparing the current spatial position information with stored previous spatial position information, and generating the switching instruction if the current spatial position information is different from the stored previous spatial position information.

5. The method according to claim 1, wherein the first display region corresponds to a first display element set, the second display region corresponds to a second display element set, and the first display element set and the second display element set have at least one common display element.

6. The method according to claim 5, wherein one of the first display region and the second display region is the target display region and the other is the non-target display region, and the preset display strategy comprises:
displaying the content to be displayed on the target display region in its normal display direction, and
displaying a mirror image of the content to be displayed on the non-target display region.

7. The method according to claim 1, wherein a light transmittance from the first display region to the second display region and a light transmittance from the second display region to the first display region meet a preset light transmittance threshold; and
the acquiring the display region selection information comprises:
acquiring a relative spatial parameter value of the display unit relative to a preset reference system; or,
acquiring a relative spatial parameter value of the display unit relative to a preset reference object.

8. The method according to claim 7, wherein the acquiring the relative spatial parameter value of the display unit relative to the preset reference object comprises:
acquiring the distance between the display unit and the preset reference object, and acquiring the relative spatial parameter value of the display unit relative to the preset reference object according to the distance and two preset distances; or,
acquiring a first sub-relative spatial parameter value of the display unit relative to the preset reference system, acquiring a second sub-relative spatial parameter value of the preset preference object relative to the preset reference system, and acquiring the relative spatial parameter value of the display unit relative to the preset reference object according to the first sub-relative spatial parameter value and the second sub-relative spatial parameter value.

9. An electronic device comprising:
at least one display unit, comprising a first display region and a second display region, the first display region and the second display region being in different planes, the first display region and the second display region being physically disposed on a single screen or being physically disposed on different screens connected to each other via rotary connector;
a target display region selection unit, adapted to acquire display region selection information, and determine a target display region from the first display region and the second display region according to the display region selection information; and
a display determination unit, adapted to acquire content to be displayed in a target display region, the content being capable of being displayed on the first display region and being capable of being displayed on the second display region, and adapted to display, according to the determined target display region and a preset display strategy, the content to be displayed on the target display region,
wherein the target display region selection unit comprises:
an image collecting module, adapted to detect whether a detection and scan region in the front of the first display region and a detection and scan region in the front of the second display region contain image information of a user; and
a touch sensing module, adapted to detect a contact area between an operating body and the first display region and a contact area between the operating body and the second display region to obtain a first contact area and a second contact area, compare the first contact area and the second contact area, and determine the target display region according to the comparison result.

10. The electronic device according to claim 9, further comprising:
a triggering unit, adapted to generate a trigger instruction when the electronic device switches from a first power consumption state to a second power consumption state, wherein the trigger instruction is used to trigger a detection module arranged in the electronic device to start up to acquire the display region selection information, and wherein a first power consumption of the electronic device in the first power consumption state is lower than a second power consumption of the electronic device in the second power consumption state.

11. The electronic device according to claim 10, further comprising:
a switching unit, adapted to re-determine a target display region from the first display region and the second display region when detecting a switching instruction for controlling target display region switch, and display, according to the re-determined target display region and a preset display strategy, the content to be displayed on the target display region.

12. The electronic device according to claim 11, wherein one of the first display region and the second display region is the target display region and the other is a non-target display region, and the electronic device further comprises:
a first switching instruction generation unit, adapted to detect whether a detection and scan region in the front of the first display region and a detection and scan region in the front of the second display region contain image information of a user, and generate the switching instruction if the detection result shows that it is needed to perform target display region switch; or
a second switching instruction generation unit, adapted to detect a contact area between an operating body and the first display region and a contact area between the operating body and the second display region to obtain a first contact area and a second contact area, compare the first contact area and the second contact area, compare the current comparison result with a stored previous comparison result to obtain a comparison value, determine whether the comparison value is greater than a first threshold, and generate the switching instruction if the comparison value is greater than the first threshold; or
a third switching instruction generation unit, adapted to detect spatial position information of the first display region and the second display region, compare the current spatial position information with stored previous spatial position information, and generate the switching instruction if the current spatial position information is different from the stored previous spatial position information.

13. The electronic device according to claim 9, wherein the first display region of the at least one display unit corresponds to a first display element set, the second display region corresponds to a second display element set, and the first display element set and the second display element set have at least one common display element.

14. The electronic device according to claim 13, wherein one of the first display region and the second display region is the target display region and the other is a non-target display region, and the display determination unit is further adapted to display the content to be displayed on the target display region in its normal display direction and display a mirror image of the content to be displayed on the non-target display region.

15. The electronic device according to claim 9, wherein a light transmittance from the first display region to the second display region and a light transmittance from the second display region to the first display region meet a preset light transmittance threshold; and
the target display region selection unit comprises: a detection unit arranged on a first body where the display unit is, for acquiring a relative spatial parameter value of the first body relative to a preset reference system.

16. The electronic device according to claim 9, wherein a light transmittance from the first display region to the second display region and a light transmittance from the second display region to the first display region meet a preset light transmittance threshold;
the electronic device further comprises a second body connected with a first body where the display unit is via a hinge; and
the target display region selection unit comprises: a detection unit arranged on the hinge, for acquiring a relative spatial parameter value of the first body relative to the second body.

17. The electronic device according to claim 9, wherein a light transmittance from the first display region to the second display region and a light transmittance from the second display region to the first display region meet a preset light transmittance threshold;
the electronic device further comprises a second body connected with a first body where the display unit is via a hinge; and
the target display region selection unit comprises: a detection unit arranged on the first body, for acquiring a relative spatial parameter value of the first body relative to the second body.

18. The electronic device according to claim 9, wherein a light transmittance from the first display region to the second display region and a light transmittance from the second display region to the first display region meet a preset light transmittance threshold;
the electronic device further comprises a second body connected with a first body where the display unit is via a hinge; and
the target display region selection unit comprises: a detection unit for acquiring a relative spatial parameter value of the first body relative to the second body, wherein the detection unit comprises a first sub-detection unit and a second sub-detection unit, the first sub-detection unit and the second sub-detection unit are located on the first body and the second body respectively, and the first sub-detection unit and the second sub-detection unit are symmetric with respect to an axis where the hinge is.

* * * * *